United States Patent [19]

Calle et al.

[11] 4,080,649
[45] Mar. 21, 1978

[54] BALANCING THE UTILIZATION OF I/O SYSTEM PROCESSORS

[75] Inventors: Jaime Calle, Glendale; Victor Michael Griswold, Phoenix, both of Ariz.

[73] Assignee: Honeywell Information Systems Inc., Waltham, Mass.

[21] Appl. No.: 751,297

[22] Filed: Dec. 16, 1976

[51] Int. Cl.² ............................................. G06F 3/00
[52] U.S. Cl. .................................................. 364/200
[58] Field of Search ............................. 364/200, 900

[56] References Cited

U.S. PATENT DOCUMENTS

| | | | |
|---|---|---|---|
| 3,810,105 | 5/1974 | England | 364/200 |
| 3,825,902 | 7/1974 | Brown et al. | 364/200 |
| 3,964,054 | 6/1976 | Annunziata et al. | 364/200 |
| 3,976,977 | 8/1976 | Porter et al. | 364/200 |
| 3,999,165 | 12/1976 | Kita et al. | 364/200 |
| 4,000,487 | 12/1976 | Patterson et al. | 364/200 |
| 4,001,783 | 1/1977 | Monahan et al. | 364/200 |
| 4,006,466 | 2/1977 | Patterson et al. | 364/200 |
| 4,028,664 | 6/1977 | Monahan et al. | 364/200 |

*Primary Examiner*—Leo H. Boudreau
*Attorney, Agent, or Firm*—Faith F. Driscoll; Nicholas Prasinos; Ronald T. Reiling

[57] ABSTRACT

An input/output system couples to a host processor through a system interface unit and includes at least two input/output processing units and a memory unit. The system interface unit includes interrupt processing logic circuits for each input/output processing unit for processing interrupt requests on a priority basis. The system interface unit further includes a processor intercommunication network which connects to each of the interrupt processing logic circuits.

The input/output operating system initiates an input/output operation in response to a connect interrupt generated by the host processor executing a connect instruction. The interrupt is directed to an assigned input/output processing unit by the System Interface Unit (SIU). The assigned processor executes an instruction sequence which causes an appropriate entry to be placed in an operating system queue located within the memory unit. The queue entry has sufficient data to specify the desired I/O operation. The processing unit in control stores information in the memory unit to specify the interrupt priority level of the connect operation, sets an interrupt request at that same priority level, and causes an interrupt at a very high priority level for the other processing unit via the intercommunication network. The high priority level interrupt causes the other processing unit to execute instructions which load the priority level information from the memory unit and set an interrupt request at the specified level. With both processing units having outstanding interrupt request at the specified priority level, the processing unit which completes all of the processes at priority levels higher or equal to that of the queue entry responds to the interrupt first. By having the least busy processing unit respond to the interrupt utilizing the queue entry to initiate the desired input/output operation process, a balance in the utilization of the input/output processing units is insured.

43 Claims, 25 Drawing Figures

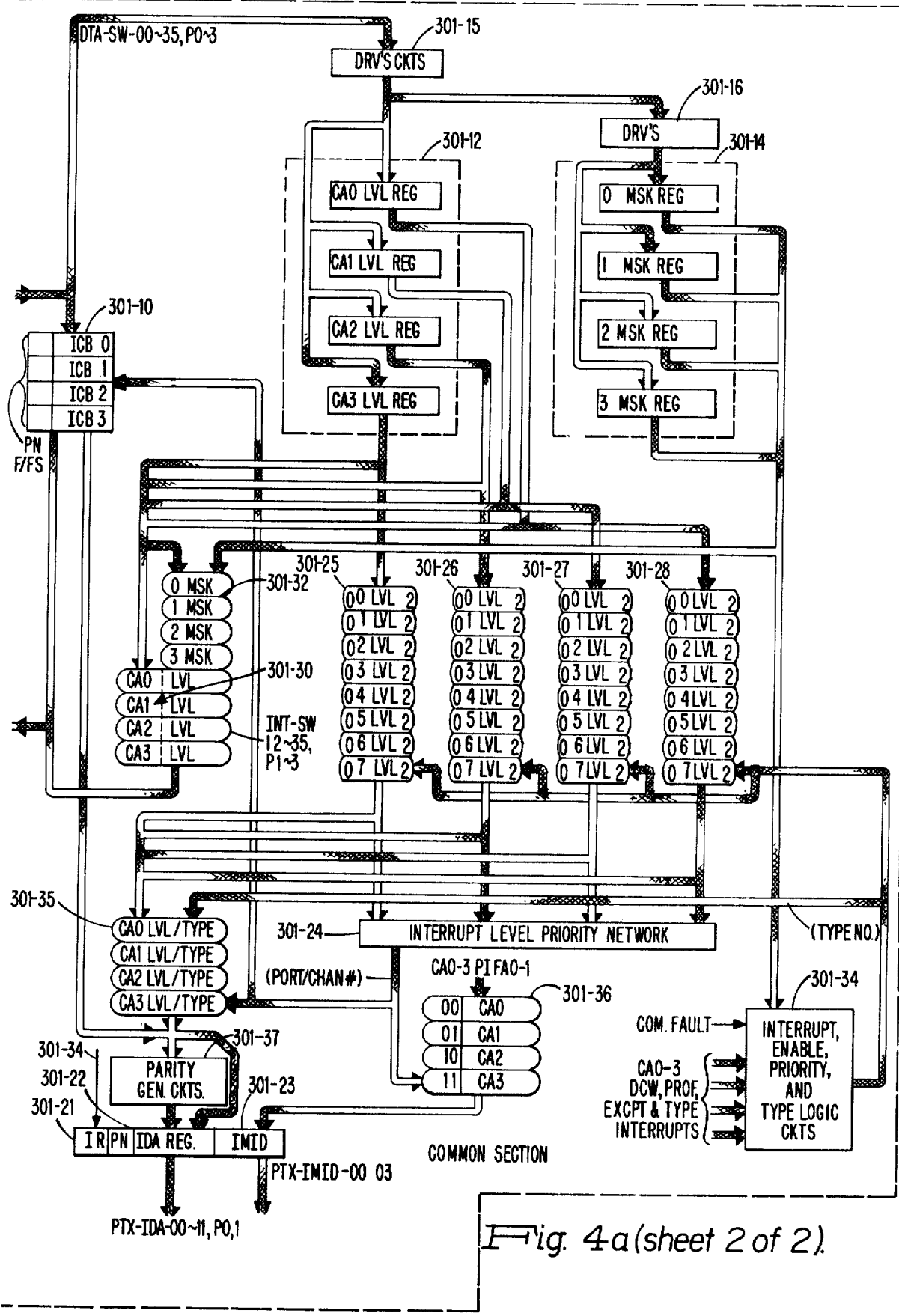
Fig. 4a (sheet 2 of 2).

| | | | |
|---|---|---|---|
| SIU PORTS A–H | ACTIVE OUTPUT PORT REQ. | AOPR | |
| | DATA TO SIU | DTS (40) | |
| | STEERING DATA TO SIU | SDTS (8) | ACTIVE MODULES |
| | MULTIPORT IDENT | MITS (5) | |
| | ACTIVE REQ ACCEPTED | ARA | |
| | ACCEPT READ DATA | ARDA | *Fig. 5a.* |
| | DATA FROM SIU | DFS (40) | |
| | MULTIPORT IDENT FROM SIU | MIFS (5) | (OMITTED ON PORTS G&H) |
| | DOUBLE PREC FROM SIU | DPFS | |
| | ACCEPT STATUS | AST | |
| | DATA INTERFACE — 600 | | |

| | | | |
|---|---|---|---|
| SIU PORTS A–F & J–L | ACCEPT PI COMMAND | APC | |
| | PI DATA FROM SIU | PDFS(40) | |
| | PI INTERFACE READY | PIR | MODULES |
| | READ DATA XFER REQ | RDTR | |
| | PI DATA TO SIU | PDTS(40) | *Fig. 5b.* |
| | READ DATA ACCEPTED | RDAA | |
| | PROGRAMMABLE INTERFACE — 601 | | |

| | | | |
|---|---|---|---|
| SIU PORTS A–F, G–H & J–L | INTERRUPT REQ | IR | |
| | INTERRUPT DATA | IDA (14) | MODULES |
| | INTERRUPT MULTIPORT IDENT | IMID (4) | (OMITTED ON PORTS G&H) |
| | LEVEL ZERO PRESENT | LZP | |
| | HIGHER LEVEL INTERRUPT PRESENT | HLIP | *Fig. 5c.* |
| | INTERRUPT DATA REQUEST | IDR | (OMITTED ON PORTS A–D & J–L) |
| | RELEASE | RLS | |
| | ACTIVE INTERRUPT LEVEL | AIL (3) | |
| | INTERRUPT INTERFACE — 602 | | |

| | | | |
|---|---|---|---|
| SIU LOCAL MEM PORTS | DATA TO MEM | DTM (40) | |
| | REQ IDENT TO MEM | RITM(10) | |
| | SPEC LINES TO MEM | SLTM (5) | |
| | ACCEPT PI COMMAND | APC | LOCAL MEM |
| | ACCEPT ZAC COMMAND | AZC | |
| | PI INTERFACE READY | PIR | |
| | ZAC INTERFACE READY | ZIR | |
| | READ DATA XFER REQ | RDTR | *Fig. 5d.* |
| | DATA FROM MEM | DFM(40) | |
| | REQ IDENT FROM MEM | RIFM(10) | |
| | DOUBLE PRECISION FROM MEM | DPFM | QUAD |
| | READ DATA ACCEPTED | RDAA | DSD |
| | SYSTEM CLOCK | SYS-CLK | |
| | LOCAL MEMORY INTERFACE — 603 | | |

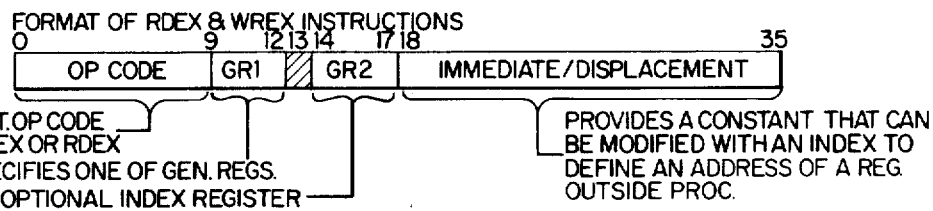
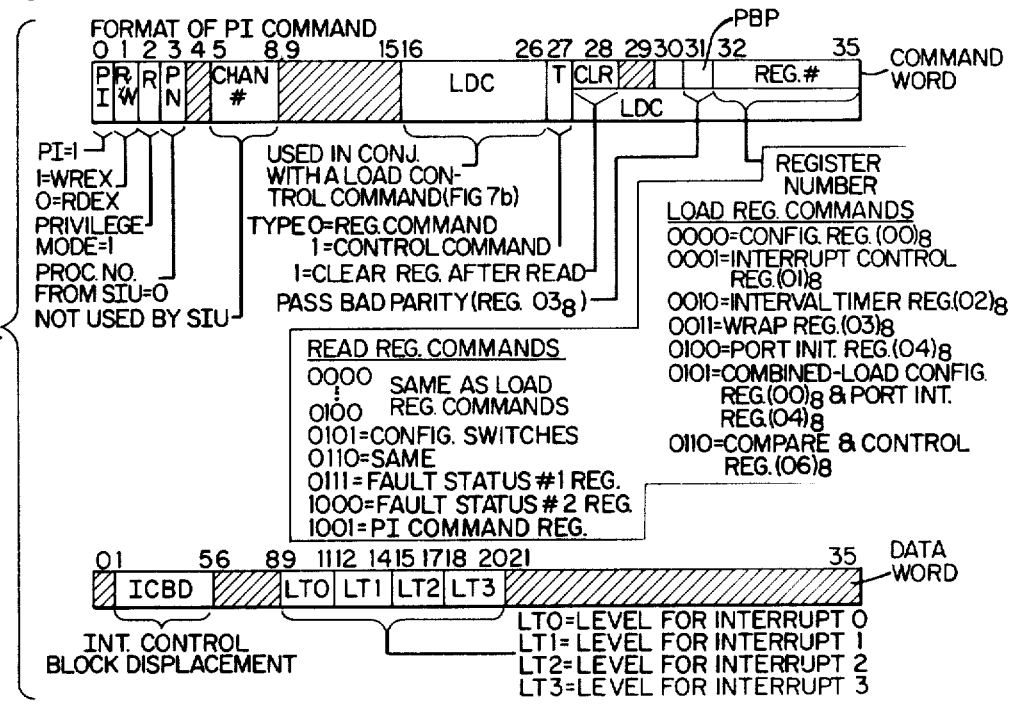
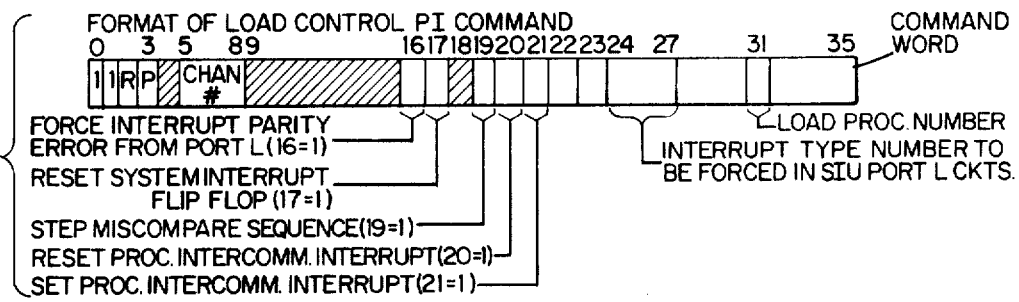
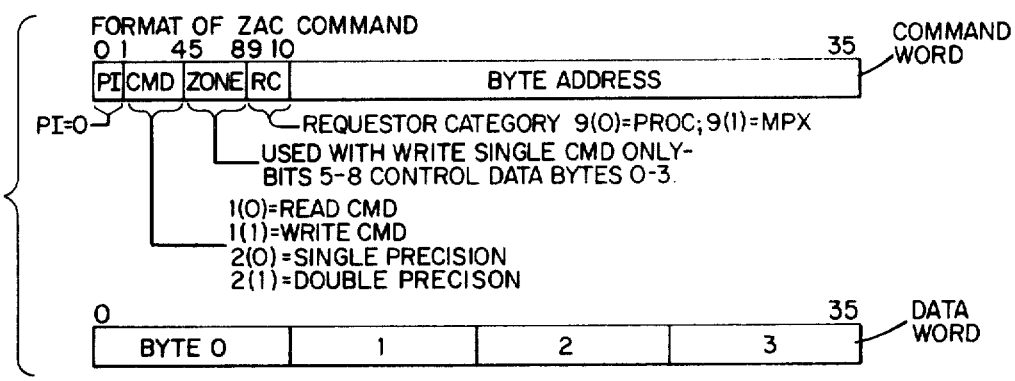

BALANCING THE UTILIZATION OF I/O SYSTEM PROCESSORS

RELATED APPLICATIONS

1. "Priority Interrupt Mechanism", invented by Jaime Calle, et al., bearing Ser. No. 562,315, filed on Mar. 26, 1975, and assigned to the same assignee as named herein, now U.S. Pat. No. 4,001,783. 2. "Dispatcher Mechanism", invented by Earnest M. Monahan, et al., bearing Ser. No. 562,314, filed on Mar. 26, 1975, and assigned to the same assignee as named herein, now U.S. Pat. No. 4,028,664. 3. "Programmable Interface Apparatus and Method", invented by G. Wesley Patterson, et al., bearing Ser. No. 562,364, filed on Mar. 26, 1975, and assigned to the same assignee as named herein, now U.S. Pat. No. 4,006,466. 4. "Multiplexer Security System", invented by Jaime Calle, et al., bearing Ser. No. 591,563, filed in June 30, 1975, and assigned to the same assignee as named herein, now U.S. Pat. No. 4,017,839.

BACKGROUND OF THE INVENTION

1. Field of Use

The present invention relates to an input/output data processing system and, more particularly, to a system for balancing the utilization of input/output (I/O) processing units.

2. Prior Art

An important factor affecting the processing efficiency of a data processing system is input/output activity. This factor becomes even more important in larger systems operating in a multiprogramming environment. In such systems, any imbalance of input/output activity results in an inefficient use of system resources as well as degradation in the overall system processing efficiency.

In order to provide for a reasonable level of efficiency, some systems include operating system routines for estimating what the load is and then assigning system process resources based upon that estimate. However, it has been found that unless the estimate includes the many time dependent factors which change dynamically, such an arrangement is unable to take advantage of dynamic changes in the laod.

In those prior art systems which are able to take certain ones of the time dependent variables into account, the processing overhead required to estimate the load becomes extremely high.

Accordingly, it is a primary object of the present invention to provide a system whose performance is improved by balancing the utilization of process resources.

It is another object of the present invention to provide an input/output processing system in which a load is balanced between a pair of input/output processing units thereby resulting in improved processig efficiency.

It is still a more specific object of the present invention to provide an input/output processing system which takes advantage of dynamic changes in the load to provide for balanced utilization of system processig units while requiring little increase in system complexity and apparatus.

SUMMARY OF THE INVENTION

The above objects are achieved in a preferred embodiment of a system which includes a host processor, a system interface unit having a plurality of ports, a memory unit and at least two input/output processing units. A different one of the system interface unit ports connects to host processor and to each of the two input/output processig units. The system interface unit of the preferred embodiment includes interrupt processing logic circuits for each input/output processing unit for processing interrupt requests on a priority basis.

In accordance with the preferred embodiment, the system interface unit further includes processor intercommunication network which connects to each of the interrupt processing logic circuits. The input/output operating system initiates an input/output operation in response to a connect interrupt caused by the host processor executing a connect instruction. The system interface unit directs the connect interrupt to an assigned input/output processing unit previously defined by the input/output operating system. The assigned processing unit executes an instruction sequence which causes an appropriate entry to be placed in an operating system queue located in the memory unit. The queue entry includes sufficient information for specifying a desired I/O operation sequence.

The input/output processing unit in control at the time of the connect interrupt is operative to store an indication of the interrupt request at the priority level specified and cause the other processing unit via the intercommunication network to set a similar indication of the interrupt at the same specified priority level. By having both input/output processing units store indications of interrupt requests, the processing unit which completes execution of all of the processes at the priority levels higher or equal to those of the queued entries responds to the interrupts first.

The arrangement described above enables the least busy input/output processing unit to process each interrupt request at a given priority level thereby providing balance in the utilization of the system input/output processing units. Moreover, the arrangement enables the input/output system to take advantage of dynamic changes in the load or demand rate for an input/output resource (i.e., processing unit).

It will be noted that the arrangement of the preferred embodiment requires little additional circuits in that it utilizes the available facilities and buses. More specifically, the state of the processor number is established by means of commands applied over existing interfaces.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 5a through 5d show in greater detail different ones of the interfaces included in the system of FIG. 1.

FIG. 6 illustrates the formats of different program instructions.

FIGS. 7a through 7c illustrate the formats of different interface commands.

DESCRIPTION OF THE PREFERRED EMBODIMENT

General Description

Figure 1:
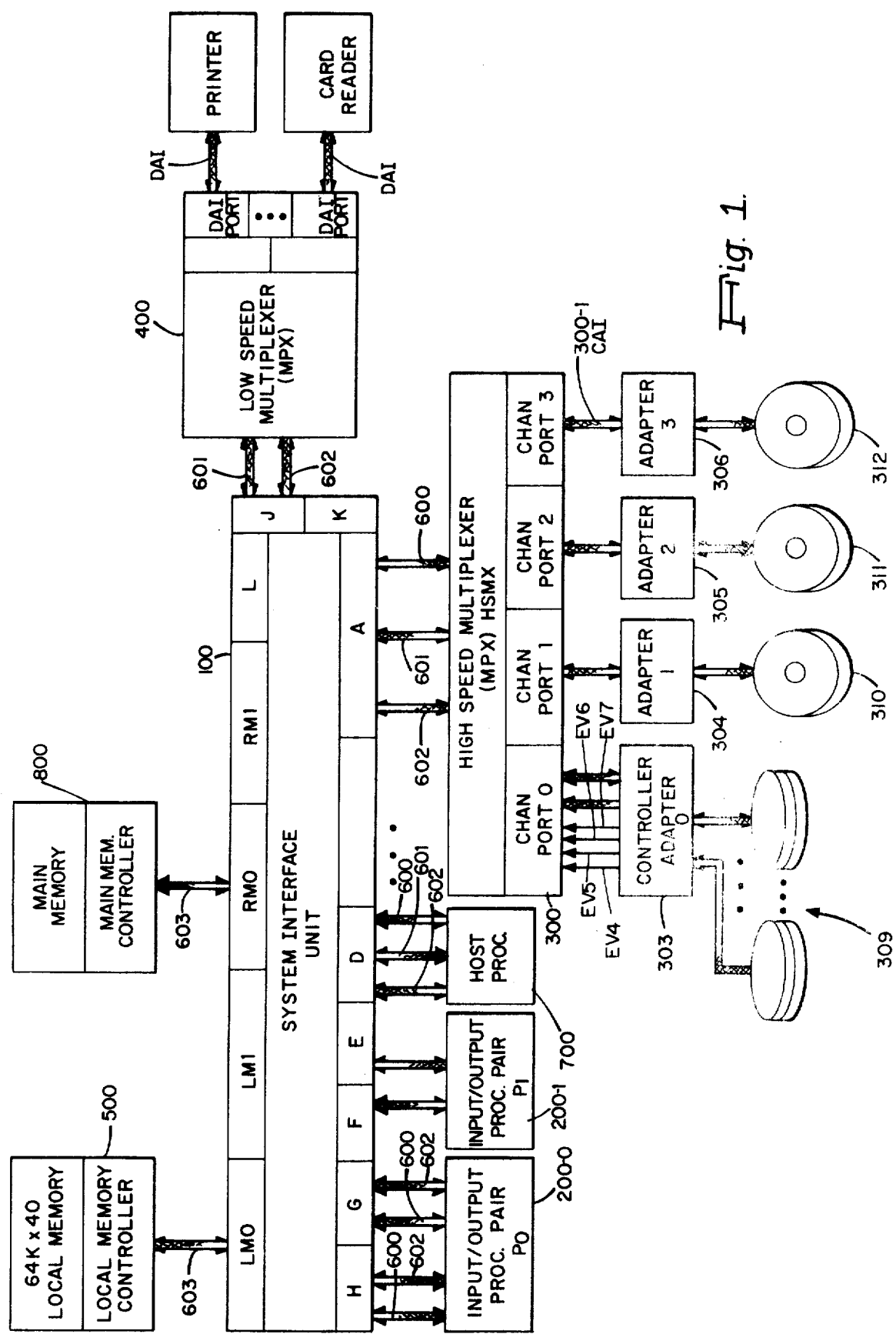
FIG. 1 illustrates in block diagram form an input/output system employing the principles of the present invention.

As seen from FIG. 1, the system which incorporates the principles of the present invention includes two input/output processor (IOPP) pairs 200-0 and 200-1, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 604. More specifically, the two input/output processors of logical pair 200-0 and 200-1, the host processor 700, and high speed multiplexer 300 connect to ports G, H, E, F, D, and A, respectively, while the low speed multiplexer 400, memory modules 500 and 800 connect to ports J, LMO, and RMO, respectively.

The input/output system of FIG. 1 can be viewed as including a number of "active modules", "passive modules", and "memory modules". The IOP processor 200, host processor 700, and high speed multiplexer 300 serve as active modules in that each has the ability to issue memory commands. The active modules normally connect to ports A through H. A plurality of passive modules are connected to two ports J, and K. These modules correspond to the low speed multiplexer 400 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input-/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low speed devices include card readers, card punches, printers, and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 303 to 306. Each of the channel controller adapters 303 through 306 which connects to a maximum of 16 devices, in turn, connects to a different one of the ports or channels 0 through 3 via the interface lines of a channel adapter interface (CAI) 300-1. The high speed multiplexer 300 connects to port A corresponding to a data interface 600, a programmable interface 601, and an interrupt interface 602.

For the purpose of the present invention, each of the channel controller adapters 303 through 306 may be considered conventional in design and take the form of controller adapters described in the aforementioned Patent 3,742,457.

As mentioned previously, each of the modules connects to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different ones of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines is given in greater detail in the section to follow.

DATA INTERFACE LINES

| Designation | Description |
| --- | --- |
| AOPR | The active output port request line is a unidirectional line which extends from each of the active modules to the SIU 100. When set, this line signals the SIU that the module requests a transfer path over which a command or data is to be transferred. |
| DTS 00-35, P0-P3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows: <br> a) The state of bit 0 — The type of command applied to the DTS lines (whether the command is a programmable interface command or a memory command). <br> b) Bits 1-4 are coded to indicate which one of the modules is to receive and interpret the command (commands are interpreted only by memory modules and programmable interface commands shall be interpreted by all modules except input/output processors 200-0). <br> c) The state of bit 5 indicates whether one or two words of the command information is to be transferred between the requesting active module and the designated receiving module (one word specifies a single precision transfer and two words specifies a double precision transfer). <br> d) The state of bit 6 indicates the direction of transfer between the requesting module and the designated receiver module. <br> e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. This set of lines is used by the SIU 100 to convey read type data to a designated one of the active modules. |
| MIFS 0-3, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

PROGRAMMABLE INTERFACE LINES

| Designation | Description |
| --- | --- |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from |

-continued
PROGRAMMABLE INTERFACE LINES
| Designation | Description |
|---|---|
| | these lines. |

A further interface is the interrupt interface 602 of FIG. 5c which provides for interrupt processing by the input/output processor pairs 200-0 and 200-1. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS), and a plurality of active interrupt level lines (AIL0-2). As seen from FIG. 5c, the interrupt interface ports G and H do not include an interrupt multiport identifier line. The description of the interrupt lines is given in greater detail herein.

INTERRUPT INTERFACE LINES
| Designation | Description |
|---|---|
| IR | The interrupt request line extends from each module to the SIU 100. When set, this line indicates to the SIU that it requires service. |
| IDA 0-3, P0<br>IDA 4-11, P1 | The interrupt data lines extend from an active module to the SIU 100. These lines are coded to contain control information required to be transferred to the input/output processor. These bits are coded as follows:<br>a) The state of bit 0 specifies to the SIU 100 which of the two processors (i.e., processor number) is to process the interrupt request.<br>b) Bits 1-3 are coded to indicate the priority or level number of the interrupt request to the SIU 100.<br>c) Bit P0 is a parity bit for bits 0-3.<br>d) Bits 4-8 are coded to provide a portion of an address required to be generated by an input/output processor for referencing the correct procedure for processing the interrupt (i.e., an interrupt control block number ICBN).<br>e) Bit P1 is a parity bit for bits 4-11. |
| IMID00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor. When set, this line indicates that there is a highest priority (level 0 interrupt) request being directed to a processor by the SIU 100. |
| HLIP | The higher level interrupt present line extends from the SIU to each input/output processor. When set, this line indicates that there is an interrupt request having a higher level or priority than the procedure or process being executed by the processor. |
| IDR | The interrupt data request line extends from the input/output processor to the SIU 100. When set, this line indicates that interrupt data is to be sent to the processor on lines DFS by the SIU 100. |
| RLS | The release line extends from each in- |

INTERRUPT INTERFACE LINES
| Designation | Description |
|---|---|
| | put/output processor to the SIU 100. This line when set, indicates that the processor has completed execution of the current procedure. |
| AIL 0-2 | The active interrupt level lines extend from the SIU to the input/output processor. These lines are coded to designate the interrupt level number of the procedure being executed by the processor. |

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed in "a dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory line (DPFM), a QUAD line, a read data accepted line (RDAA) and a system clock line (SYS-CLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

LOCAL MEMORY INTERFACE LINES
| Designation | Description |
|---|---|
| DTM 00-35,<br>P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3,P0<br>RITM 4-7,P1 | The requestor identifier to memory lines constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows:<br>a) Bits 0-1 are port number selection bits coded to specify which port or subchannel within the attached module is to received or interpret the memory command sent to the module.<br>b) Bit 2 is a read/write to memory bit which is included in the steering control information received from the active |

LOCAL MEMORY INTERFACE LINES

| Designation | Description |
|---|---|
| | module which is forwarded by the SIU to the local memory 500 when a new command is sent to the memory by the SIU 100. The state of this bit indicates the direction of data transfer. |
| | c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500 |
| PIR/ZIR | The programmable interface ready line/ZAC interface ready line extends from the local memory module 500 to the SIU 100. When set, each line signals the SIU 100 that the local memory memory module 500 is capable of accepting a programmable interface (PI)/memory (ZAC) command. |
| RDTR | The read data transfer request line extends from the local memory module 500 to the SIU 100. This line, when set, indicates that the ready type data previously requested by a ZAC or PI command is available along with the necessary control information to be sent to the module requesting the data. |
| DFM 00–35, P0–P3 | The data from memory lines are a four byte wide unidirectional bus which extends from the local memory module 500 to the SIU 100. These lines are used to return read requested type data to an active module via the SIU 100. |
| RIFM 0–3, P0, RIFM 4–7, P1 | The two groups of requestor identifier from memory lines extend from the local memory module 500 to the SIU 100. These lines are coded for directing the read data from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows |
| | QUAD DPFM |
| | 0 0    one word single precision |
| | 0 1    two words, double precision |
| | 1 X (don't care)    four words |
| DSD | The read data/status identifier line extends from the local memory module 500 to the SIU. The state of the line signals the SIU 100 whether the information applied to the lines DFM is read data or status information when line RDTR is set. When set, the line indicates status information of one or two words (QUAD=0) |
| DSD | is being transferred. When set to a binary ZERO, the line signals that up to four words of data are being transferred, the number being specified by the coding of lines QUAD and DPFM. |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected |

LOCAL MEMORY INTERFACE LINES

| Designation | Description |
|---|---|
| | to a clock included within the input/output processor to synchronize the operations of each memory from a common system clock source. |

Detailed Description of Input/Output Processor 200

Figure 2:
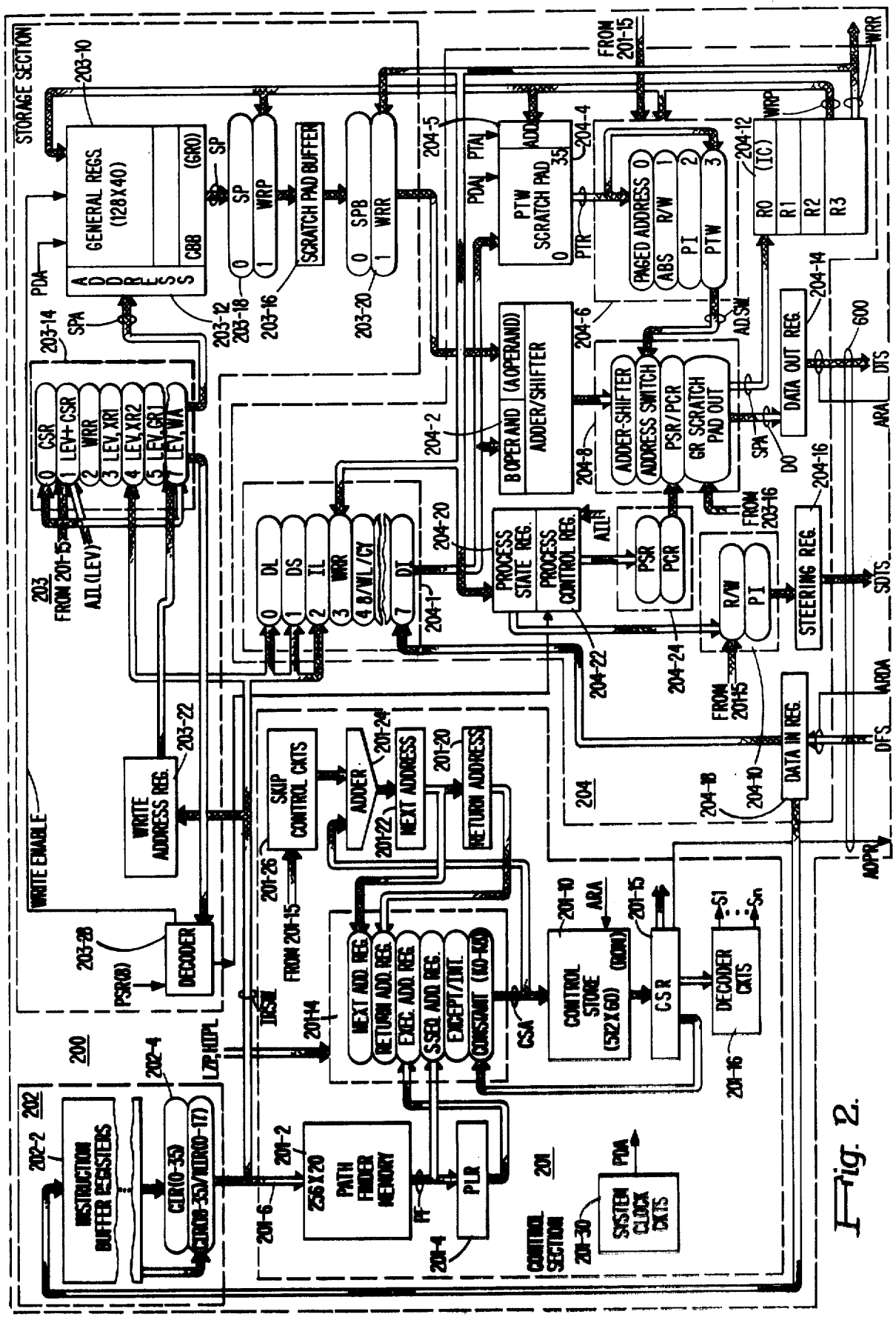
FIG. 2 shows in greater detail a single input/output processing unit of a processor pair of FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

Control Store Section 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as the other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions) or the exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 2, required for establishing appropriate memory cycles of operation for control section as well as timing signals for operating other sections of processor 200 and the other modules of the system of FIG. 1 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers", by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that, as in most controlled machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al., which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups or registers associated with eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GR0) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2–14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) - 16 (ECB # +1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + 16 (ICB#). The ICB# is obtained from the interrupt word as explained herein. Similarly, the ICB is a four word block and it contains values for the PSR, IC, GR14, and PTBR registers.

Processing Section 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
|---|---|
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment. |

The term "fault" does not necessarily mean the occurrence of a hardware failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level corresponding to the bit position (i.e., bit 28 = level 0). The bit positions 27-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, positions 0 and 1 of address switch 204-6, when selected by an address control field of a microinstruction word stored in register 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO, and bits 9-35 equal bits 9-35 of bus WRP which correspond to the absolute address of the PI command.

Figure 13:
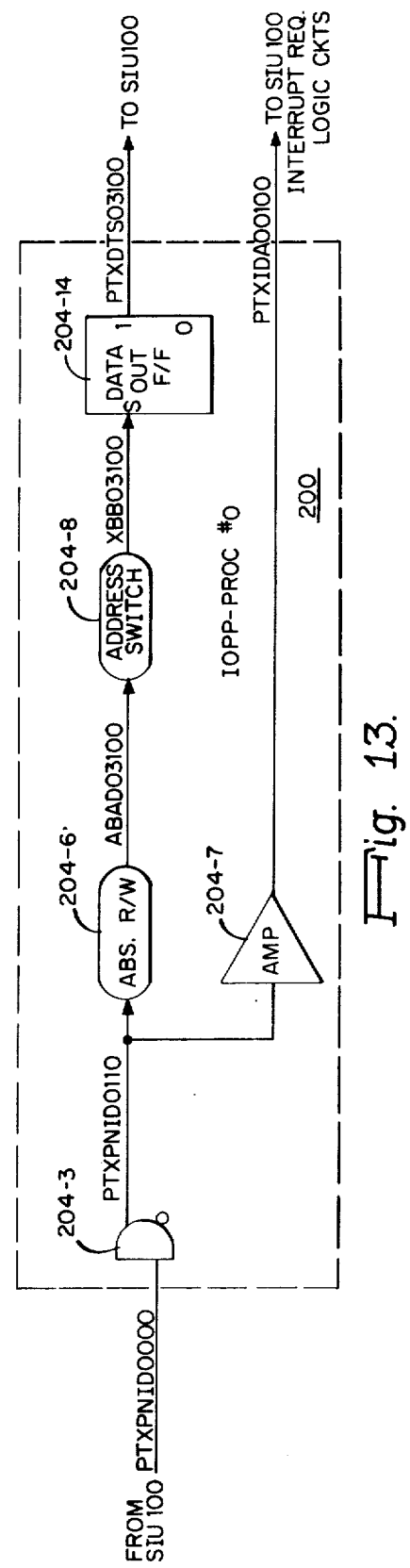
FIG. 13 illustrates in greater detail different portions of the input/output processor's circuits of FIG. 2.
Figure 9:
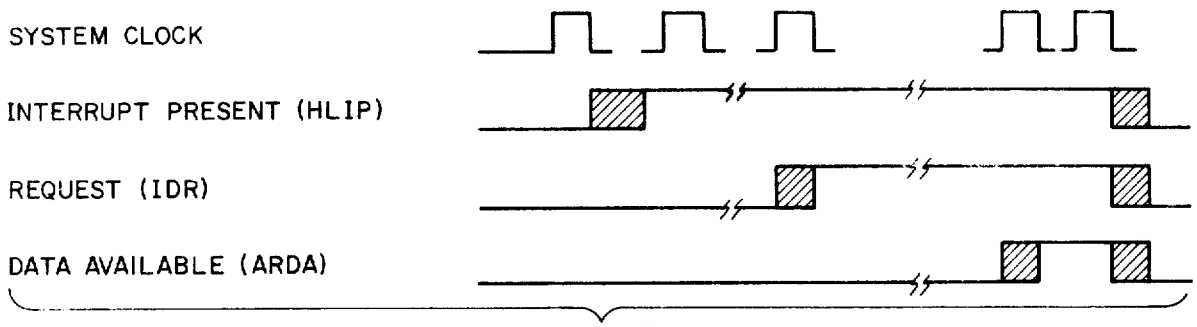
FIG. 9 illustrates the signal sequence for processing an interrupt.
Figure 10A:
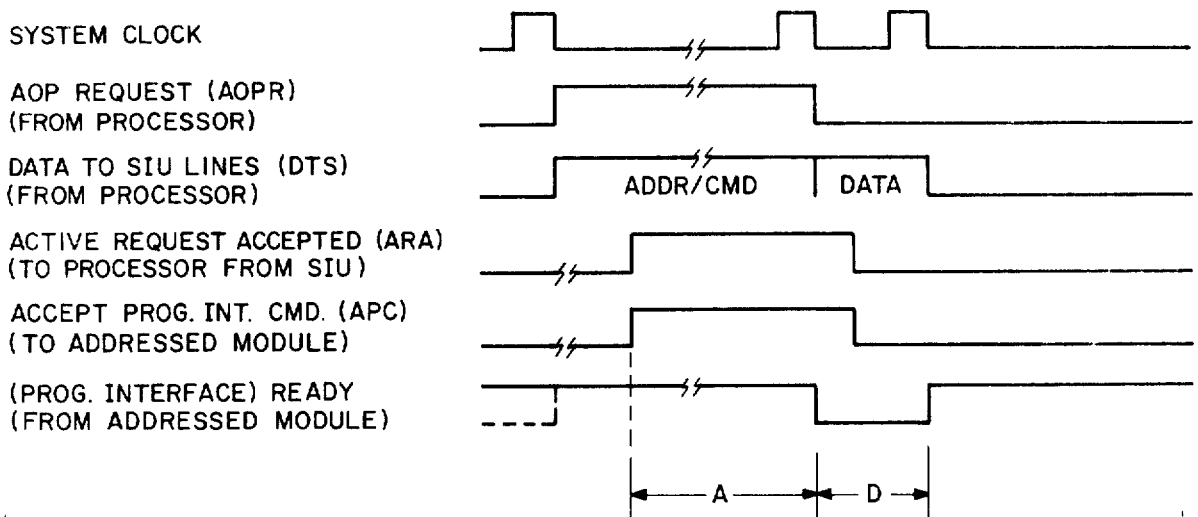
FIGS. 10a and 10b illustrate the signal sequences for transferring a WREX command.
Figure 10B:
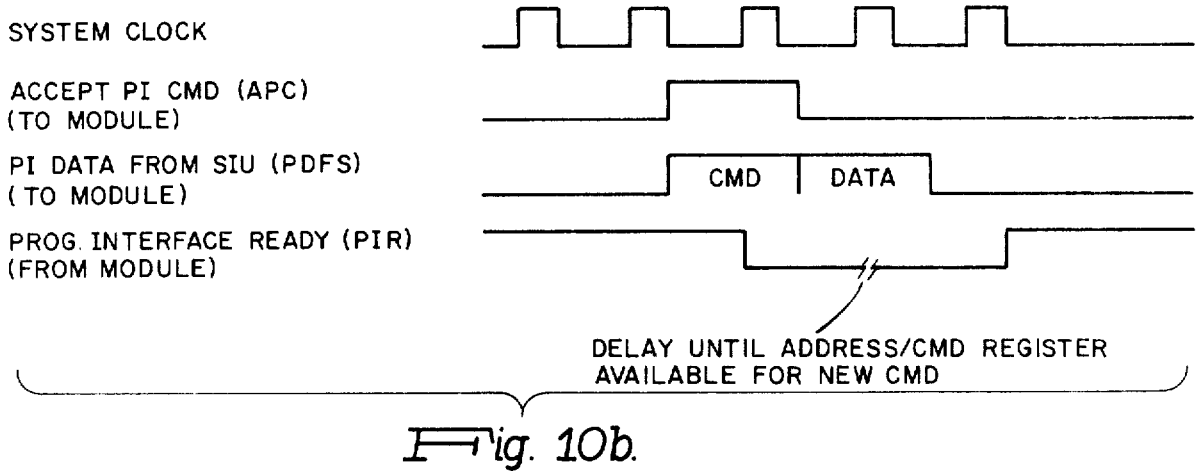
Figure 14:
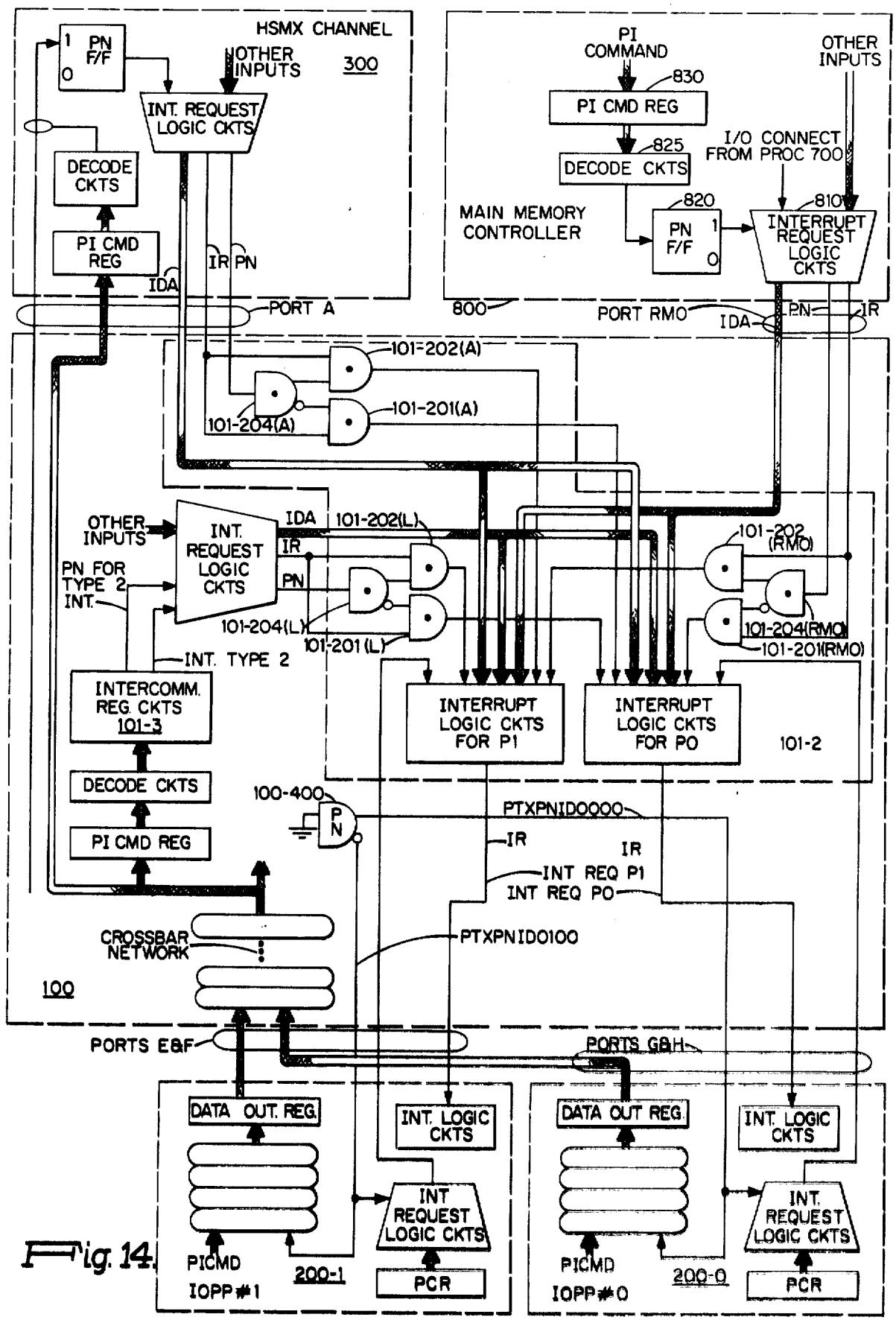
FIG. 14 illustrates in greater detail different portions of the system of FIG. 1 in accordance with the present invention.

FIG. 13 illustrates in greater detail the specific circuits of each I/O processor of FIG. 2 which provide a processor number signal for that processor. From the figure, it is seen that the source of the signal is the SIU 100. More specifically, FIG. 14 shows a single gate 100-400 which provides a "hardwired" processor number signal. This means that the pair of processors connected to ports G and H are defined as processor number 0 while the pair of processors connected to ports E and F are processor number 1. Therefore, as shown, the processor number signal (i.e., signal PTXPNID0100) from gate 100-400 applied to pair P1 is a binary ONE. In FIG. 13, a gate 204-3 applies a signal PTXPNID0110 to one of the input terminals of the absolute address portion of switch 204-6 and then to one of the input terminals of the address switch position of switch 204-8. An output terminal switch 204-8 is then loaded into a particular stage of data out register 201-14. The binary ONE side of the stage is applied as an input to the SIU 100 as part of a PI command. It will be noted from FIG. 13 that the signal PTXPNID0110 is applied via an amplifier circuit 204-7 as signal PTXIDA00100 as an input to the SIU 100 interrupt request circuits (see FIG. 3c). It should be noted that the input to gate 204-3 is either PTXPNID0100 or PTXPNID0000 depending upon if the IOPP pair is connected to ports E and F (processor #1) or to ports G and H (processor #0).

DETAILED DESCRIPTION OF SYSTEM INTERFACE UNIT 100

Interrupt Section 101

Figure 3A:
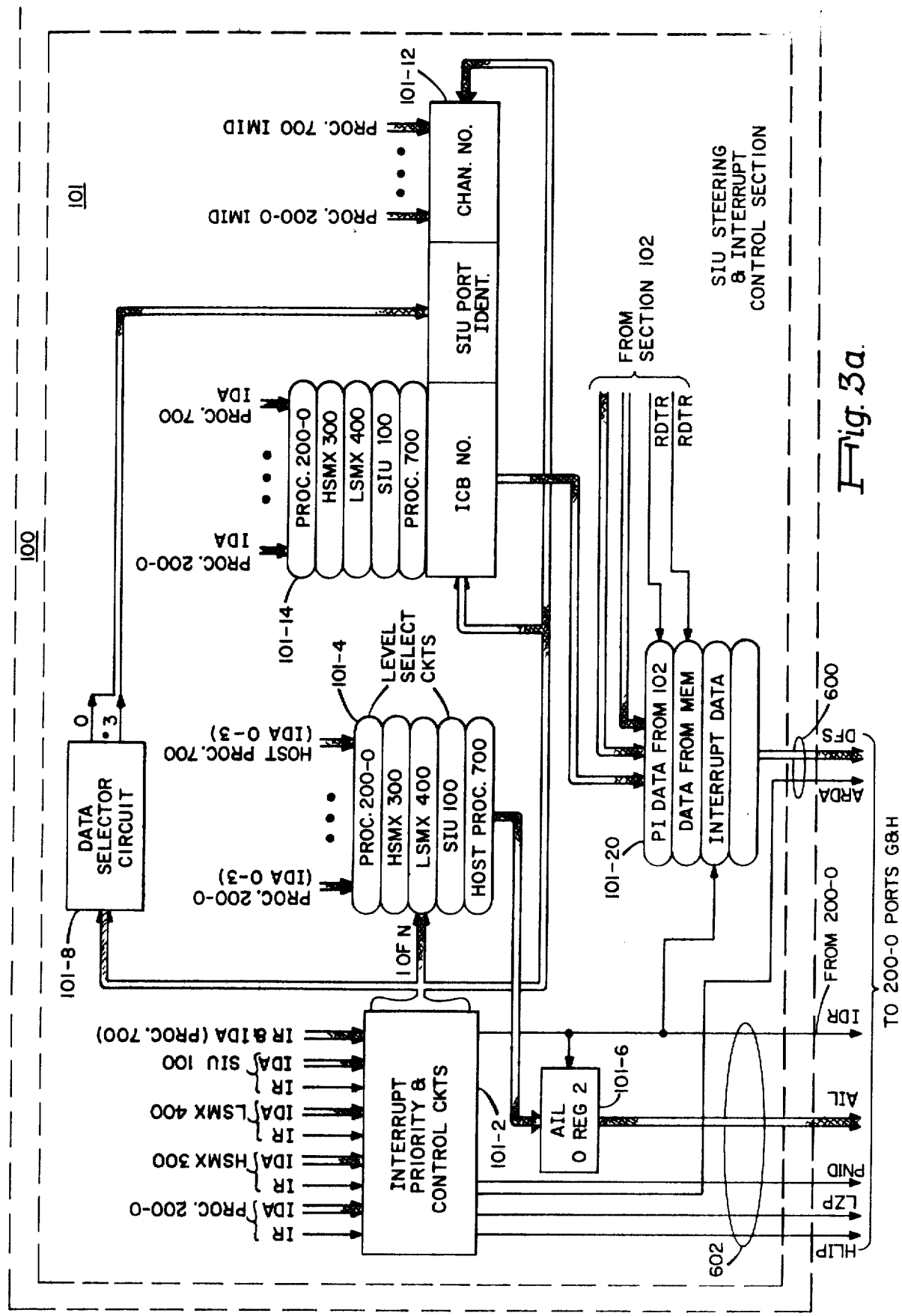
FIGS. 3a through 3d show in greater detail the system interface unit 100 of FIG. 1.

The System Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G, and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to processor 200. The identifier information includes an eight bit interrupt control block number including a parity bit, a three bit interrupt level number and a one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.
This means that in the system of FIG. 1 the port of the current process has the highest priority followed by the SIU 100, the high speed multiplexer 300, the host processor 700, the processor 200, and the low speed multiplexer 400.

Figure 11:
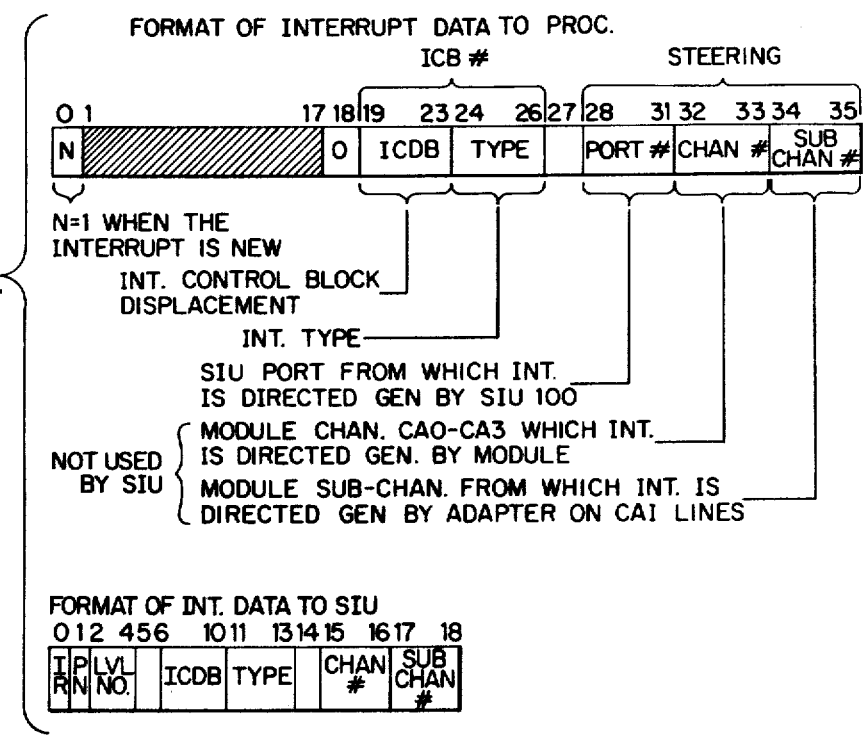
FIG. 11 illustrates the format of an interrupt data word.

The priority circuits of block 101-2 are operative to generate an output signal on one of $n$ number of output lines, $n$ corresponds to the number of interrupting modules within the system. The $n$ output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows (see FIG. 11).

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein.

Bits 32-35 are generated by the modules having multiple ports and identify the subchannel or port within the source module as explained herein.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LM0 |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting sub-channel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Before describing the data transfer section 102 of FIG. 3b, the priority circuits and other circuits used with the present invention will be discussed herein in connection with FIGS. 3c and 3d.

Interrupt Circuits 101-2

Figure 3B:
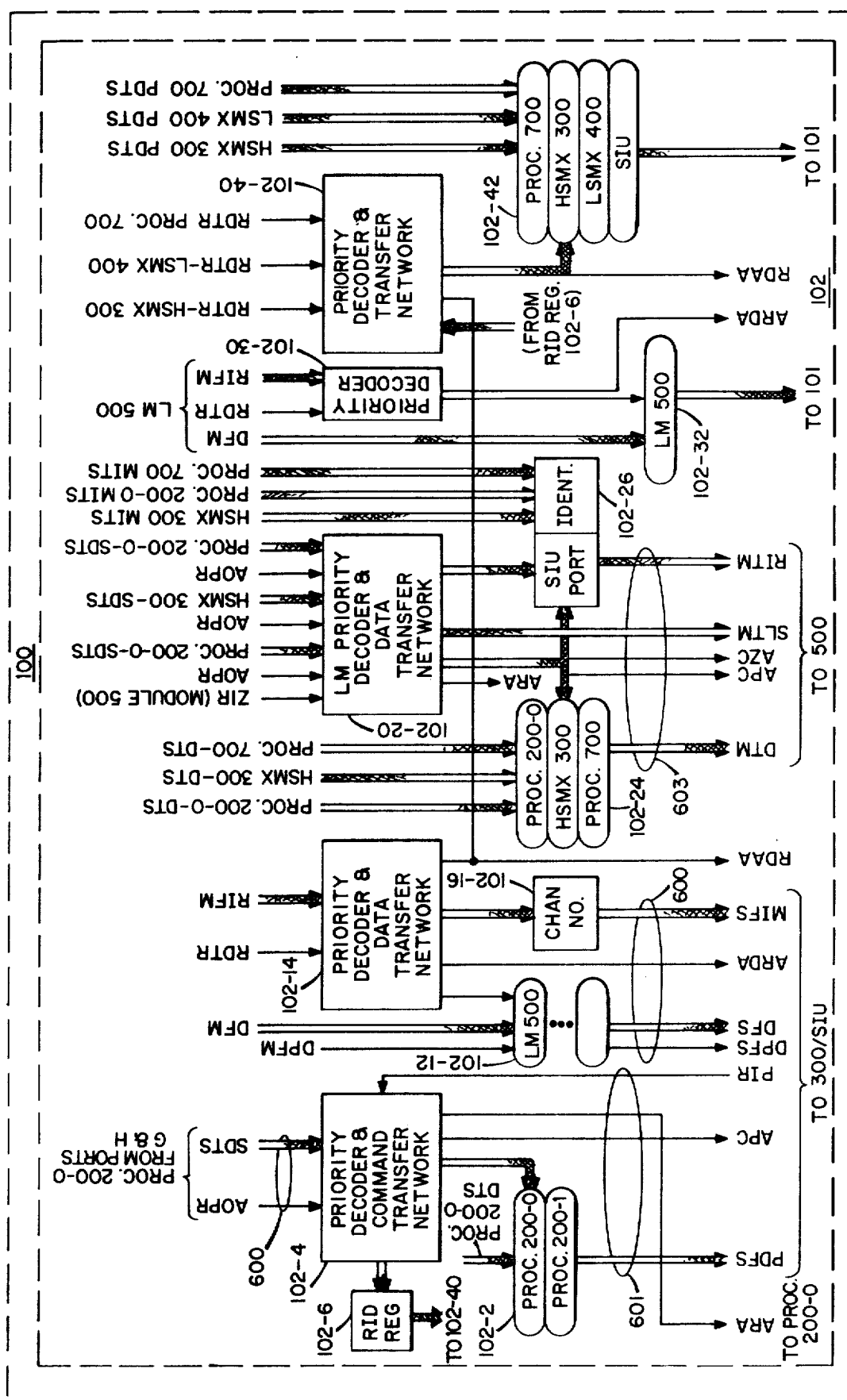
Figure 3C:
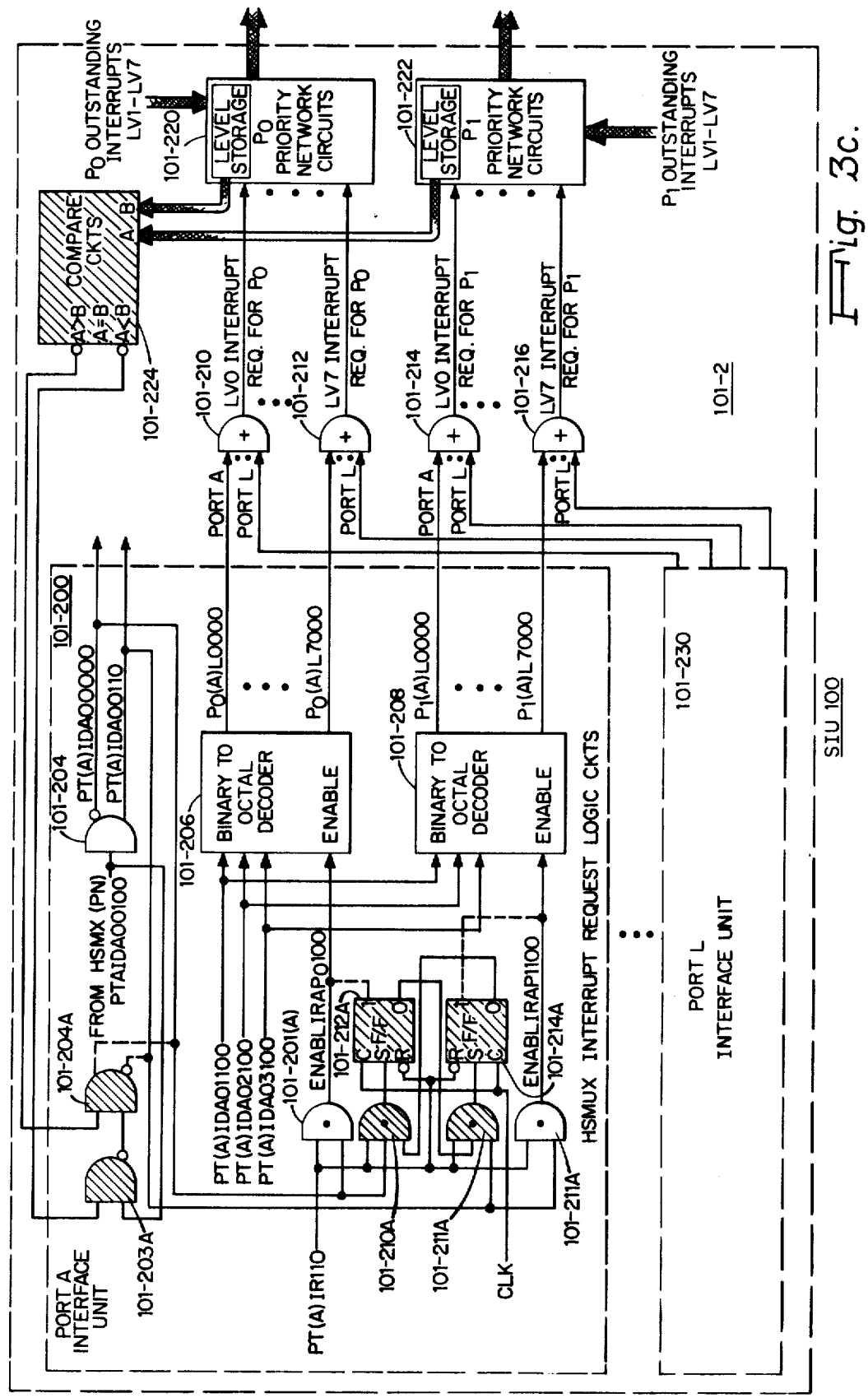

FIG. 3c illustrates in greater detail a portion of the interrupt priority and control circuits 101-2. More specifically, this figure shows the port priority interrupt request logic circuits which are associated with the pair of processors P0 connected to ports G and H and the pair of processors P1 connected to ports E and F. As seen from FIG. 3c, the circuits of block 101-200 are duplicated for each port. For ease of explanation, only the circuits of port A are shown in detail.

Since the operation of the above circuits is described in detail in the patent applications "Priority Interrupt Mechanism" and "Dispatcher Mechanism", it will be only discussed to the extent necessary for a complete understanding of the present invention.

A port and/or unit connected to the port initiates an interrupt request and forces an interrupt request signal, as, for example, PT(A)IR110, to a binary ONE. This signal is applied to a pair of AND gates 101-201 and 101-202 together with the processor number signal indications. As explained herein, the present invention employs two pairs of processors P0 and P1 and, hence, the state of a single processor number bit furnished by the port defines which one of the processor pairs is to process the interrupt request.

More specifically, in the case of port A, when multiplexer 300 holds the PN signal PTAIDA00100 at a binary ZERO, and NAND/AND gate 101-204 switches signals PT(A)IDA00110 and PT(A)IDA00000 to a binary ZERO and ONE, respectively. This, in turn, causes AND gate 101-201 to force an enable signal ENABLIRAP0100 to a binary ONE while AND gate 101-202 holds an enable signal ENABLIRAP1100 at a binary ZERO. Thus, a binary to octal decoder circuit 101-206 for processor pair P0 is enabled while a binary to octal decoder circuit 101-208 for processor pair P1 is disabled. Accordingly, when the state of the processor number bit is reversed, the decoder circuit 101-206 is disabled while the decoder circuit 101-208 is enabled.

As seen from FIG. 3c, each of the decoder circuits 101-206 and 101-208 is connected to receive a three bit binary number corresponding to signals PT(A)IDA01100 through PT(A)IDA03100. This corresponds to the interrupt priority level to be decoded. The enabled decoder circuit converts the level into the appropriate one of eight outputs by forcing one of the eight output signals (i.e., P0(A)L7000 through P0(A)L0000 and P1(A)L7000 through P1(A)L0000) to a binary ONE.

The same priority level output signals for each processor pair from the decoder circuit for each port (i.e., ports A through L) are combined in corresponding ones of the OR gates 101-210 through 101-216, as shown. That is, each of the OR gates collects all of the priority level numbers from all of the SIU ports and applies them as inputs to priority network circuits 101-220 and 101-222 of each processor pair as shown in FIG. 3c.

Each of the circuits 101-220 and 101-222 establishes the highest priority level number of each interrupt request generated and presented to each processor pair. When the highest priority level number (i.e., level 0) is presented, the processor pair is interrupted immediately. However, when none of the ports generates a level 0 interrupt request, the priority network circuits present the highest priority level present which is then compared with the priority level of the process currently being executed by the processor pair. This establishes which process has the highest priority level for a next clock cycle. When two or more ports generate interrupt requests at the same priority level, the network circuits establish priority on the basis of port, as mentioned previously.

It will be noted that each of the priority network circuits 101-220 and 101-222 receives signals which represent the outstanding interrupt priority levels of those processes which had been interrupted previously by higher priority processes and, therefore, were not completed. These signals are stored in a register (not shown) included in SIU 100. The state of a flip-flop, not shown, indicates whether the highest priority interrupt request is a new interrupt request or an interrupt request from a process whose execution is to be resumed for completion.

For further information regarding the interrupt circuits, reference may be made to the related applications referenced in the introduction portion of the instant specification.

Processor Intercommunication Register Circuits 101-3

Figures 3D, 4C:
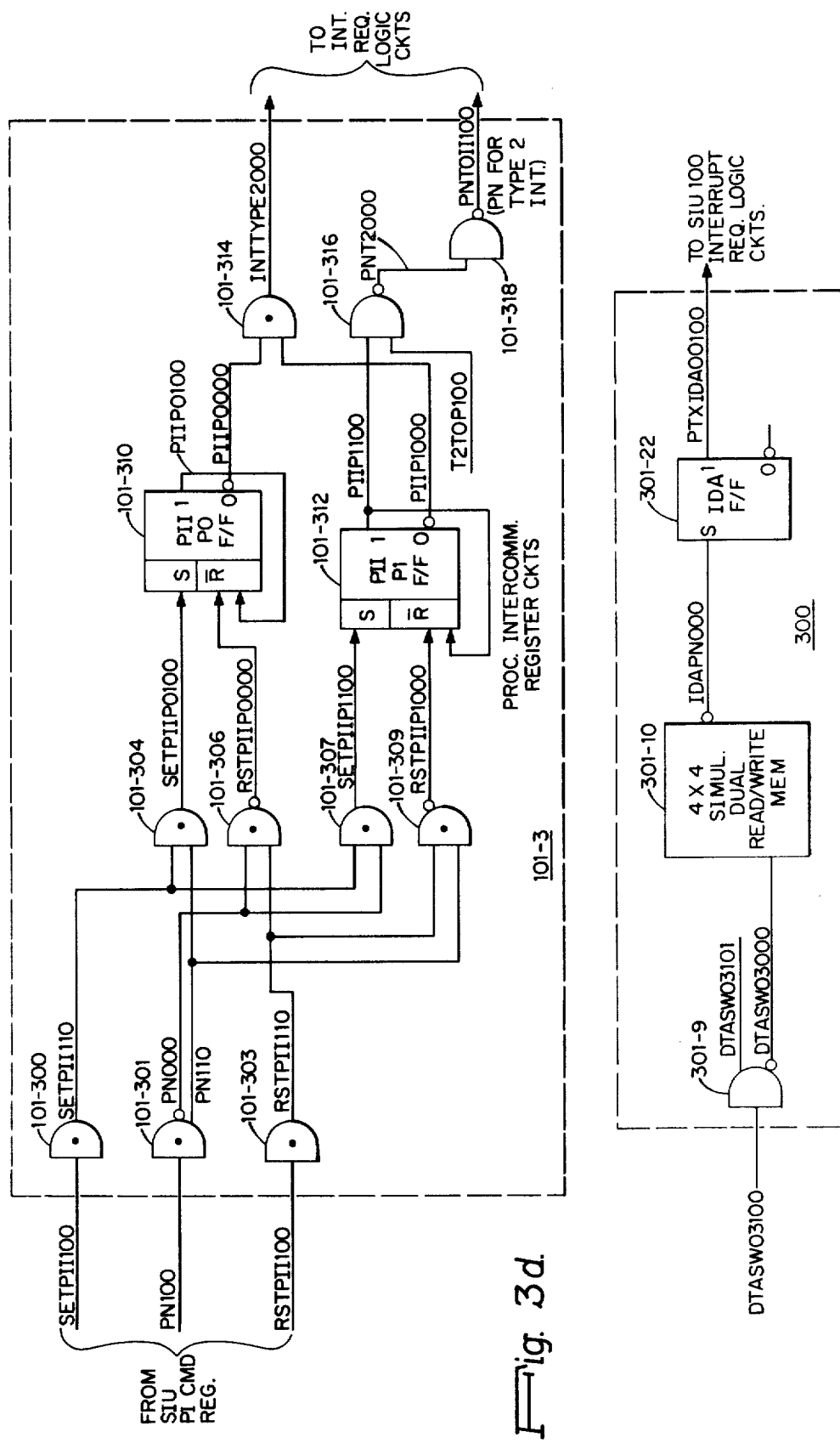

FIG. 3d illustrates the circuits through which processor pairs P0 and P1 establish communications therebetween. It is seen that the circuits include a plurality of AND and NAND gates 101-300 through 101-309 which apply set and reset input signals to the set and reset inputs of a pair of D type flip-flops 101-310 and 101-312, as shown. In response to a PI command, the SIU 100 generates an appropriate one of the signals SETPI1100 and RSTPI1100 which sets and resets the appropriate one of the pair of flip-flops 101-310 and 101-312. The selection is established in accordance with the state of the PN signal PN100 obtained from the PI command.

The binary ZERO output sides of the flip-flops 101-310 and 101-312 are applied to an AND gate 101-314. The gate 101-314 forces signal INTTYPE2000 to a binary ONE when both flip-flops 101-310 and 101-312 are in a binary ZERO or reset state. This indicates the absence of a type 2 interrupt. However, when one of the flip-flops is in a binary ONE state, signal INTTYPE2000 is forced to a binary ZERO. This indicates the presence of a type 2 interrupt.

The binary ONE side of a flip-flop 101-312 is applied as one input of an NAND gate 101-316 which receives signal T2TOP100 from the interrupt priority circuits of the SIU 100. These circuits establish the highest priority type signal in accordance with a fixed priority. Such circuits can be considered conventional in design. When the signal T2TOP100 is set to a binary ONE, this indicates that the type 2 interrupt has the highest or top priority and the intercommunication interrupt is passed on to the input/output processor.

When both signals are binary ONE, NAND gate 101-316 forces signal PNT2000 to a binary ZERO. This signal is applied to a further NAND gate 101-318 together with other signals, not shown. The NAND gate 101-318, in turn, forces signal PNTOII100 to a binary ONE. The state of signal PNTOII100 defines the PN signal for the type 2 interrupt. This signal and signal INTTYPE2000 are applied as inputs to the interrupt request logic circuits of the SIU 100.

Data Transfer Section 102

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e., not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with the SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 300 and only processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer commands during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling memory module 500 that the data has been accepted by multiplexer 300.

An arrangement similar to network 102-14 is used by SIU 100 to transfer PI and memory commands from any one of the modules of FIG. 1 to local memory module 500. The module 500 is operative to force either the programmable interface ready (PIR) line or ZAC interface ready (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that a module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are, in turn, applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

DETAILED DESCRIPTION OF HIGH SPEED MULTIPLEXER 300 COMMON SECTION

Figure 4A:
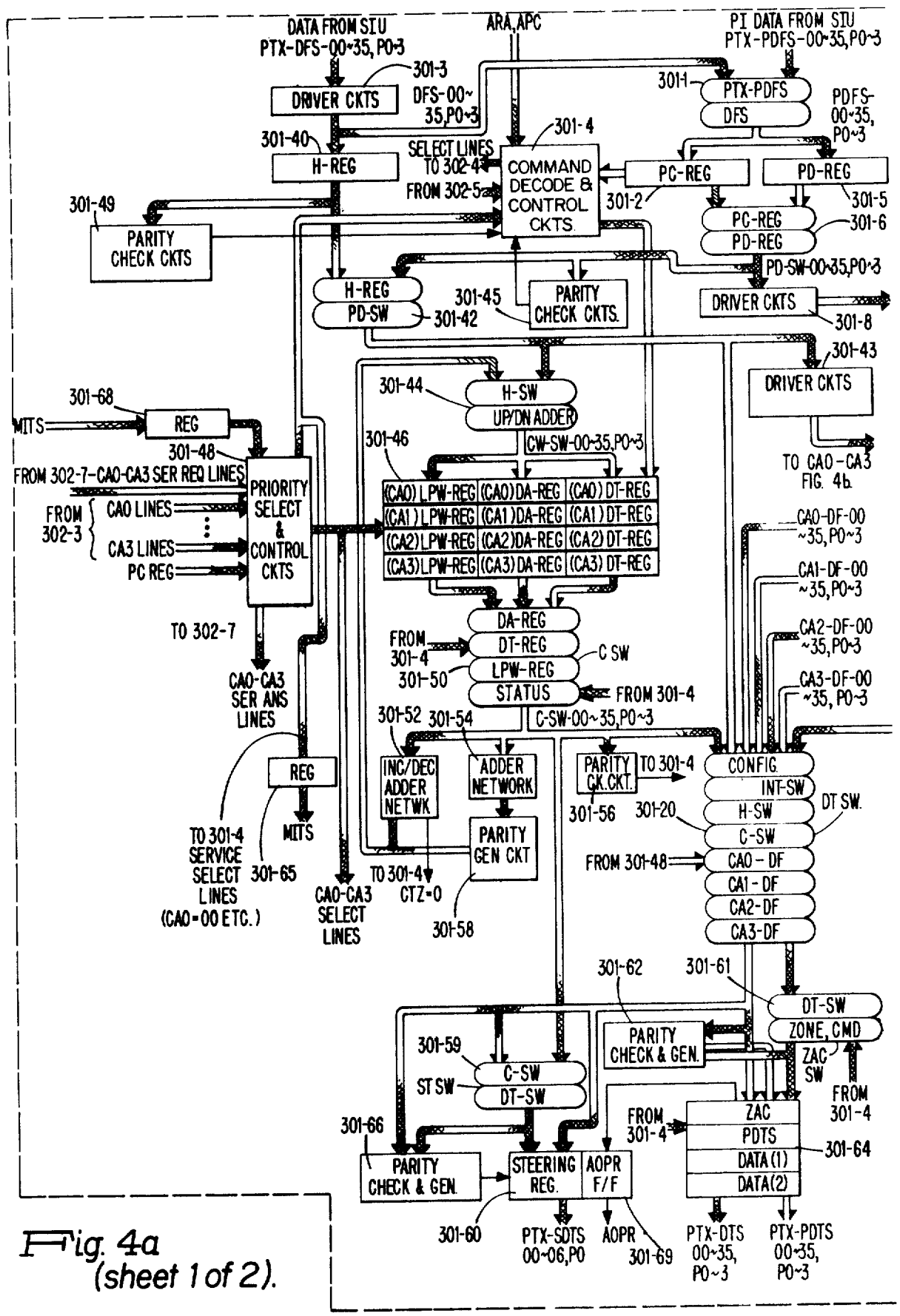
FIGS. 4a and 4b show in greater detail the multiplexer unit 300 of FIG. 1.
Figure 4B:
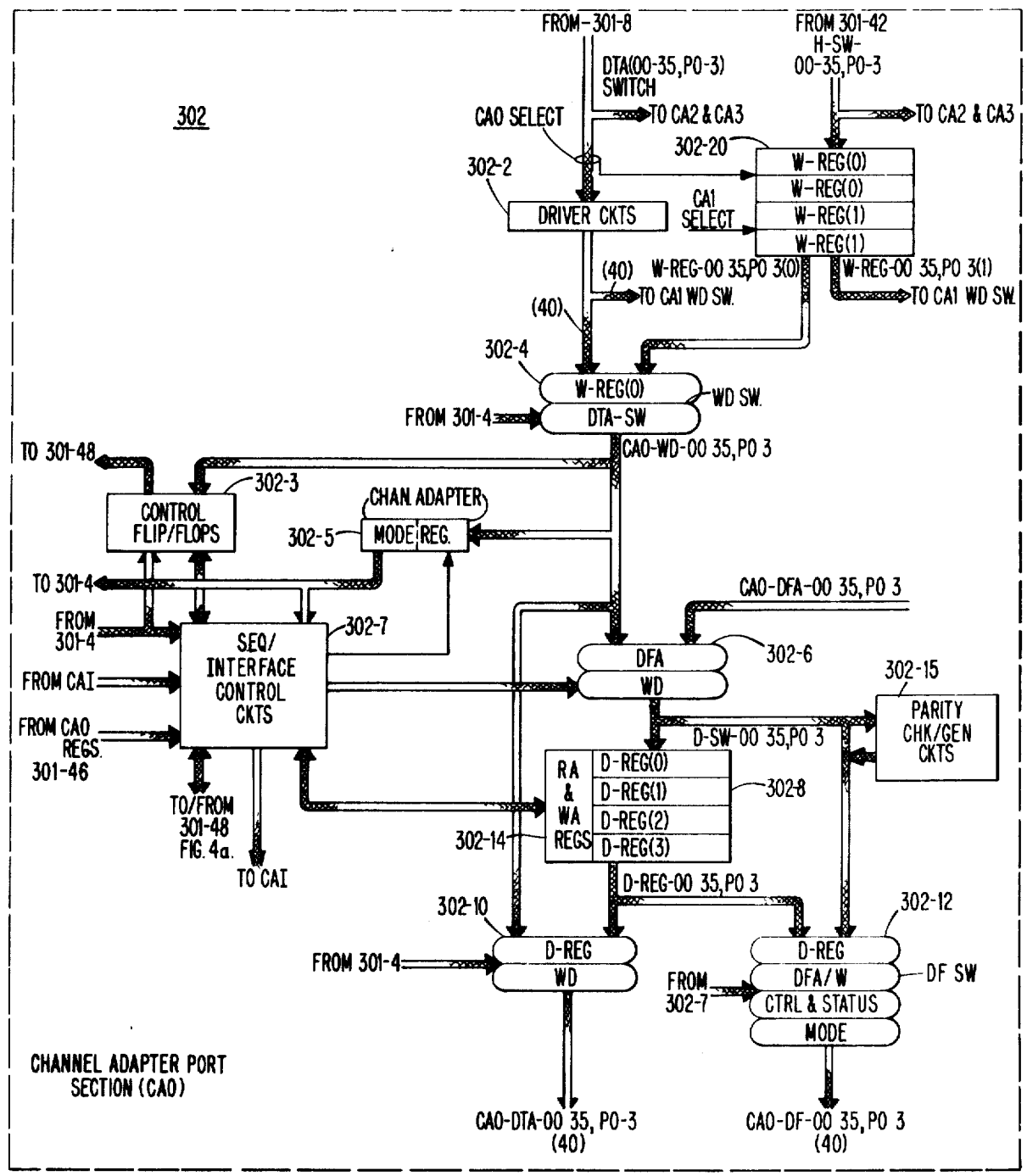
Figure 8:
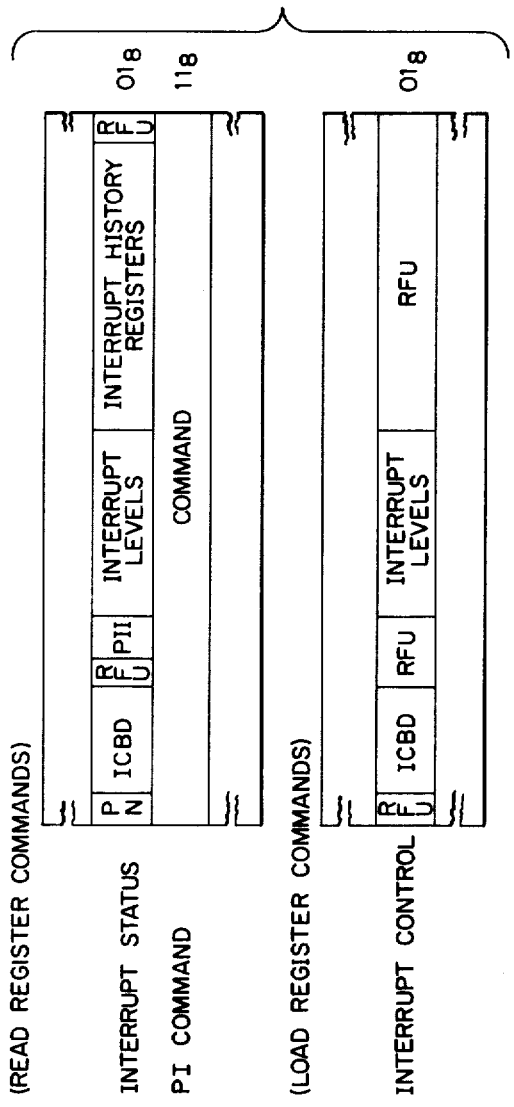
FIG. 8 illustrates the format of the contents of different registers of system interface unit 100.

FIGS. 4a and 4b disclose in greater detail the common control section 301 and a portion of the channel adapter section 302. Referring first to FIG. 4a, it is seen that the common control section includes a pair of registers 301-2 and 301-5 for storing the words of a PI command received via the PDFS lines of the multiplexer programmable interface 601 through a two position data selector switch 301-1. The switch 301-1 enables PI command signals from an alternate path (i.e., DFS lines) to be loaded into registers 301-2 and 301-5. However, in the preferred embodiment, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selector switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5 and 301-40 and apply signals representative of the results to the circuits of block 301-4 which provides status signals applied to C switch 301-50. These circuits comprise logic circuits, conventional in design, which combine signals from register 301-2 with signals from the channel adapter sections to generate control signals necessary for executing the commands received from processor 200.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises four 8 bit registers, conventional in design, which may take the form of registers disclosed in the aforementioned Texas Instrument publication (e.g. TI 7481). Output signals from each of these registers can be selectively applied as an input to an interrupt position of selector switch 301-20 together with the corresponding signals from a four position selector switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-25 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4a, the circuits of block 301-34 receive groups of interrupt request signals from channel adapters in addition to groups of interrupt signals generated by the controller adapters attached to the channel adapters. More specifically, each CA channel can generate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0-3 corresponding to EV0-EV3 while the four controller adapter types of interrupt requests are numbered 4-7 corresponding to EV4-EV7. The events having the lowest codes have the highest priority (e.g. 000 = highest priority = EV0 = fault interrupt and 111 = lowest priority type = EV7 = off-line interrupt). The priority for the different types of interrupt requests is fixed and is determined by the type number. For further information regarding the assignment of priority types, reference may be made to the copending application titled "Programmable Interface Apparatus" which is assigned to the assignee of the present invention. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level/type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e., CA0=00=λ highest priority, CA3=11= lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00=CA0 etc. ). The output of switch 301-36 is applied to IMID register 301-23 as depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4a, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output register 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4a, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1; and Data 2 respectively store memory command signals, PI data signals and channel adapter data signals. The output signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

CHANNEL ADAPTER SECTIONS

FIG. 4b shows the registers and data selector switch which comprise each of the channel adapter sections CA0-CA3. Since each of the sections are identical, only section CA0 is shown. It is seen that the section receives output signals from data transfer switch 301-6 and H switch 301-42. The signals from DT switch 301-6 are applied via driver circuits of block 302-2 to a two position data selector (WD) switch 302-4. The output command signals from switch 302-4 can be loaded selectively into either a mode register 302-5 or into a plurality of control flip-flops 302-3 in response to control signals from 301-4.

Output signals from the mode register 302-5 and the control flip-flops are applied as inputs to the logic circuits of block 302-7 which generate the required control signals for execution of a command by the controller adapter connected to the section. Also, the circuits of block 302-7 receive control signals from block 301-4 from the register group 301-46 associated with the channel adapter and from the lines of the controller adapter interface.

In the present embodiment, the controller adapter interface includes the following lines.

| CONTROLLER ADAPTER LINES | |
|---|---|
| Designation | Description |
| DTA | The data to adapter lines are 40 lines which extend from the module 300 to the controller adapter used to transmit data including commands and addresses to the adapter. |
| ADTA | The accept data to adapter line extends from the module 300 to the adapter and when set indicates that data is available on the DTA lines and that it should be accepted by the adapter. |
| ACTA | The accept control to adapter line extends from the module 300 to the adapter and when set indicates that a PI command or data is available on the DTA lines and that it should be accepted by the adapter. |
| CHBSY | The channel busy line extends from the module 300 to the adapter and when in an indirect mode indicates to the adapter that the multiplexer 300 is now in an Auto data transfer mode; the channel remains busy until the termination of the Auto data transfer operation. In a direct mode, this line is set when a memory (ZAC) command is received from the adapter and remains set until either the requested read data is transferred or status is returned from the memory module. |
| CDR | The channel data ready line extends from the module 300 to the adapter and when set indicates that the module 300 is ready to accept more data or commands from the adapter. |
| EDT | The end data transfer line extends from the module 300 to the adapter and is used during Auto data transfer operations in indirect mode to indicate that the last word of data has been transferred (Write) or that the last word of data has been stored (Read). |
| DFA | The data from adapter lines are 40 lines which extend from the controller adapter in module 300 used to transfer data including memory addresses, commands, to module 300. |
| PIDFA | The port identifier from adapter lines are two lines from the adapter to module 300 used in conjunction with the interrupt lines to indicate which subport on the controller adapter caused the interrupt. |
| ADFA | The accept data from adapter line extends from the adapter to module 300 and when set indicates that data or memory command is applied to the DFA lines and should be accepted by module 300. |
| AD-BUSY | The adapter PI busy line extends from the adapter to module 300 and when set indicates that the adapter has accepted a PI command and |

-continued

| CONTROLLER ADAPTER LINES | |
|---|---|
| Designation | Description |
| | is not capable of accepting any more commands. |
| ADR | The adapter data ready line extends from the adapter to the module 300 and when set indicates to the channel that the adapter is ready to accept more data. |
| IFA | The interrupt from adapter lines are four lines which extend from the controller adapter to module 300 and indicate the type of interrupt requests (i.e. generates EV4-EV7 signals applied to block 301-34). |
| TFA | The terminate from adapter line extends from adapter to module 300 and when set indicates the termination of a data transfer operation to module 300. |

It will be appreciated that the controller adapter interface includes other lines required for performing other functioning such as initializing, enabling, etc.

Output signals from switch 302-4 are applied to a further two position selector switch 302-6 which also receives data signals applied to the lines DFA by the controller adapter associated therewith. During a data transfer operation, the output signals from the DFA position of switch 302-6 are loaded into different ones of the four 40 bit data registers 302-8 for transfer to common section 301 via a four position switch 302-12 or to the controller adapter via a two position selector switch 302-10. Additionally, output signals from WD switch 302-4 are transferred to the controller adapter via the WD position of switch 302-10. Different ones of the registers 302-8 are selected for loading and unloading by the address signals stored in read and write address registers of block 302-14 which are modified by signals generated by the circuits of block 302-7. Also, these WA and RA registers supply signals indicative of the number of words stored which are used to determine the status of a transfer operation.

During a data transfer operation, the parity check and generation of circuits block 302-14 are operative to check the parity of the data signals received from the controller adapter via switch 302-6 and generate appropriate parity as required. It is also seen that switch 302-4 receives signals from the first pair of channel write data registers (W Reg 0, W Reg 1) which store two words of information for transfer from H switch 301-42 to either the registers 302-8 or directly to the controller adapter via the selector switch 302-10.

FIG. 4c illustrates in greater detail the specific circuits of multiplexer 300 of FIG. 4a which provide a signal corresponding to the processor number. From the figure, it is seen that the sources of such signal correspond to a bit position within each of the four channel storage locations of block 301-10. The output signal IDAPN000 is loaded into the higher order bit position of register 302-22 of FIG. 4a. This signal is, in turn, applied as an input to the SIU 100 as part of the interrupt request data.

Figure 12:
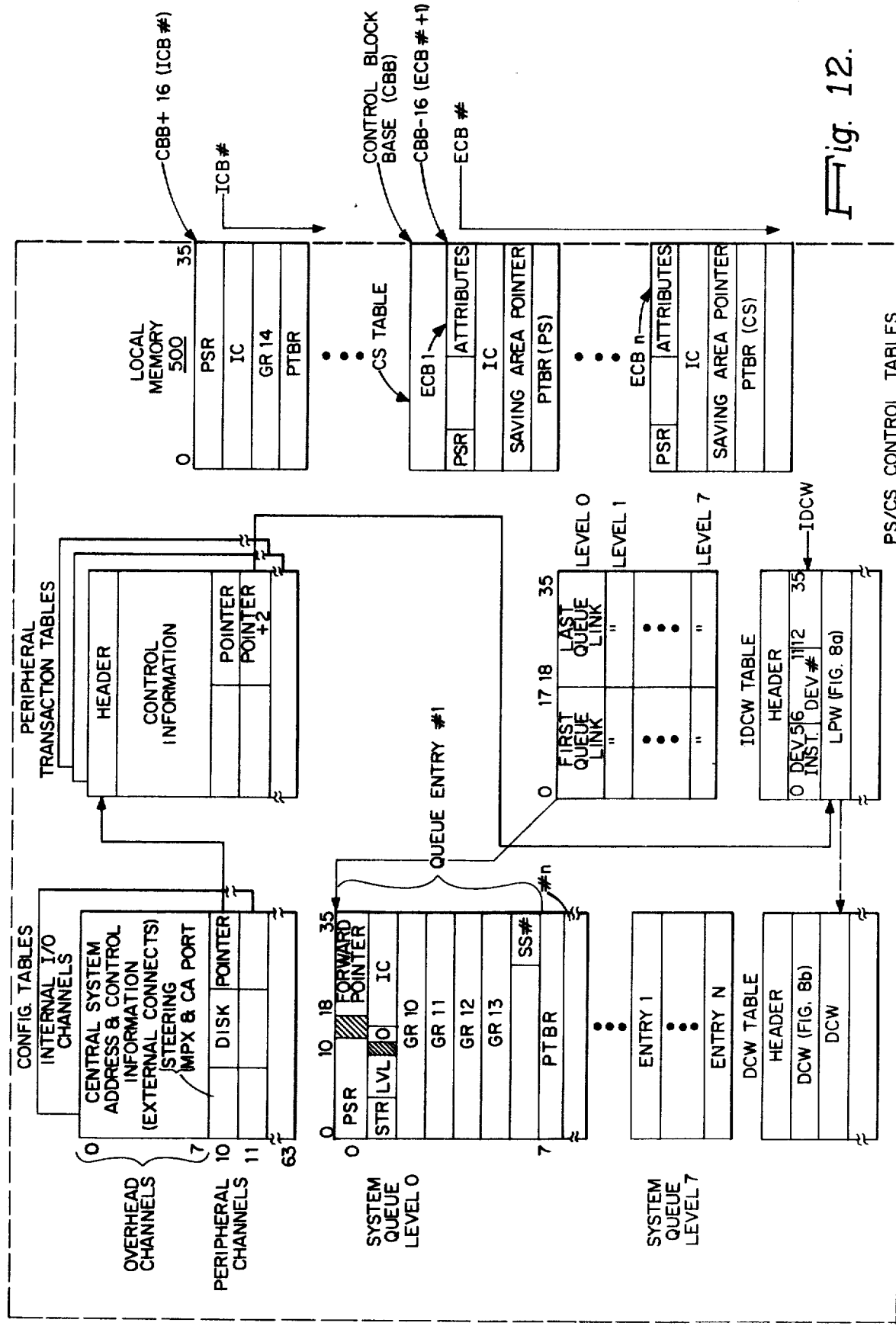
FIG. 12 illustrates the organization of memory module 500 in accordance with the present invention.

Before describing the operation of the present invention, reference will be first made to FIG. 12. This figure illustrates the various control tables and queues included in local memory 500. With the exception of the system queues, the remaining tables are discussed in considerable detail in the copending patent application "Multiplexer Security System" and will only be discussed in detail herein to the extent necessary in understanding the operation of the present invention.

In general, processes within the input/output system of FIG. 1 are initiated by interrupts or scheduled for execution by previous processes through the use of a queue/dispatch mechanism. As mentioned, the dispatcher mechanism is described in one of the patent applications referenced in the introductory portion of this specification. The processes running at any one of the eight hardware levels can queue other processes at that level or below using the system queue of FIG. 12. A set of queue/dequeue routines which, for the purpose of the present invention, may be considered conventional in design are entered via a master mode entry (MME) instruction. These types of routines are discussed in U.S. Pat. No. 3,618,045, invented by D. J. Campbell, et al. When general register location GR14 contains the information indicating that an entry is to be queued, a queue routine constructs an eight word entry which it stores and links on the appropriate queue chain of FIG. 12.

The first two words of the queue entry is formatted as follows:

| WORD 0 = bits | 0–11 | | = PSR |
|---|---|---|---|
| | 11–17 | | = must be zero (MBZ) |
| | 18–35 | | = forward pointer |
| WORD 1 = bits | 0–3 | (S) | = steering if by IC |
| | 4–6 | (LVL) | = level to dispatch at |
| | 7–8 | (RFU) | = reserved for future use |
| | 9 | (E) | = 0 for IC |
| | | | 1 for entry point |
| | 10 | (P) | = 1 = pass PSR steering |
| | 11 | (O) | = 1 = queueing overlay |
| | 12 | (C) | = 1 = queue at current process level |
| | 13–15 | | = RFU |
| | 16 | (X) | = used by certain routines |
| | 17 | (N) | = 1 = do not dispatch this queue |
| | 18–35 | | = IC or SS#, Major # and Minor # |

The remaining words correspond to the contents of various general registers (e.g. GR10-GR13, IC, PTBR).

The queue routine also sets the one of interrupt level bits of the PCR register of the input/output processor as explained herein to the level requested and returns to a location of the MME instruction +4. The processes are dispatched via a dispatch instruction in which the PSR, IC, GR14, and PTBR registers are loaded from a location specified by the address field of the instruction. These instructions are discussed in the related applications and in the patent application "Processor for Input-/Output Processing System", invented by Marion G. Porter, et al., bearing Ser. No. 562,317, filed Mar. 26, 1976, and assigned to the same assignee as named herein.

Referring to FIG. 12, it is seen that each eight word entry includes pointer information (QLPF), linkage information (QLLOC), the contents of general registers G10 through G13 to be passed along by the dispatcher, and page table base information (QLPTBR). The format of information QLLOC (GR14) is as follows:

| 1. | Bits | 0–3 | = reserved for future use |
|---|---|---|---|
| 2. | Bits | 4–6 | = priority level to dispatch at |
| 3. | Bit | 7 | = reserved for internal use |
| 4. | Bit | 8 | = reserved for future use |
| 5. | Bit | 9 (entry) | = 0 for IC |
| | | | 1 for external entry point |
| 6. | Bit | 10 | = 1 for passing PSR steering to queue |
| 7. | Bit | 11 | = 1 for queuing overlay (information in GR7) |
| 8. | Bit | 12 | = 1 for queue at current level |

—continued

| 9. | Bits | 13–17 | = | (insert into LVL-bits 4–6) reserved for future use |
|---|---|---|---|---|
| 10. | Bits | 18–35 | = | IC (local) or |
| | | | | Bits 18–23 = subsystem number (SS#) |
| | | | | Bits 24–29 = major entry number (major #) |
| | | | | Bits 30–35 = minor entry number (minor #). |

In general, the system dispatcher is activated when the dispatcher mechanism responds through an ICB to one of the eight software set interrupts. The first entry stored in the system queue at the activated level is returned to the available queue chain and the specified process is dispatched or run with the following information: IC, Page Table Base, GR10-13, and certain timer information. The dispatched process or routine gives up control by executing a RELEASE instruction. The dispatcher, upon regaining control, continues to dispatch processes until the queue chain has been exhausted at that level. Then the interrupt bit in the PCR register for the current level is reset and the processor executes a RELEASE instruction enabling the process at the next lower level interrupt to gain control of the system.

DESCRIPTION OF OPERATION

The operation of the input/output system of the present invention will be described with reference to FIGS. 1-14. It will be assumed by way of example that a connect command is issued by the host processor 700 to the main memory controller 800 of FIGS. 1 and 14. The connect command is coded to specify that the input-/output system is to perform a new input/output operation in connection with a particular channel. This type of command is described in detail in U.S. Pat. No. 3,413,613, referenced previously. The command generated by the processor 700 is applied through the SIU 100 to the main memory controller 800. This command is decoded in a conventional manner and generates an interrupt request to the interrupt request logic circuits of block 810. More specifically, the controller 800 includes a connect register which retains the modulo 4 sums of the connects received and the connects answered. The controller 800 generates a connect interrupt whenever the connects answered does not equal the connects received. When an RDEX command is directed to the port coded to specify the reading of the connect register with bit 28 set, the connect answered sum is incremented by one when the connects answered does not equal the connects received.

As seen from FIG. 14, the main memory controller 800 also includes a processor number flip-flop 820. This flip-flop is under the control of the input/output system software and is normally set or reset to a particular state when the system is "bootloaded" and remains in that state. The actual setting/resetting is accomplished via a PI load control command coded to have the format of FIG. 7b wherein bit 31 is set to a binary ONE. The PI command is generated by the input/output processor 200-0 and transferred to a PI command register 830 of controller 800 via the SIU crossbar network. Upon being decoded by the decoder circuits 825, the processor number flip-flop 80 will be set or reset as specified by bit 31 of the PI command word.

By way of example, it is assumed that the flip-flop 820 is initially switched to a binary ZERO state. Accordingly, this specifies that each interrupt request generated by the memory controller 800 in response to a connect command is to be directed to processor pair 200-0 or P0. That is, as seen from FIG. 14, the binary ZERO output signal from flip-flop 820 is applied via the interrupt request logic circuits 810 as the processor number signal to NAND/AND gate 101-204 (RMO). The remaining signals are applied via the IDA lines and the interrupt request (IR) line is forced to a binary ONE.

As discussed previously in connection with FIG. 3c, the three gates 101-202 (RMO), 101-204 (RMO), and 101-201 (RMO) establish whether the interrupt request should be directed to the interrupt logic circuits for processor pair P0 or the interrupt logic circuits for processor pair P1. It will be appreciated that each of the interrupt logic circuits of block 101-2 takes into account the interrupt priorities due to levels, ports, etc. Subsequently, the SIU 100 will force the interrupt request (IR) line to a binary ONE and apply the interrupt request having the format of FIG. 11. This interrupt request is arranged to specify a reasonably high priority level (level 4) so that the processor pair will be interrupted from other less important tasks in order to process new connect commands. The operating system routine is specified by the interrupt control block (ICB) number assigned by the operating system to the memory controller 800 to which a 2 bit interrupt type number (i.e., type 1) is appended. Together with level numbers associated with the three interrupt types, the ICB numbers are stored in a 6 bit register and in three 3 bit registers, respectively.

The procedure or operating system routine designated to answer the connect requests (connect queueing routine) is operative to store a few parameters which identify the addressed device and the command to be executed by the particular device required for dispatching the appropriate device handler routine to execute the command. The information is included as part of the connect and is obtained by accessing mailbox locations in main memory via ZAC commands directed to memory controller 800. That is, the host processor 700 operating system, which can be considered to take the form of those modules disclosed in U.S. Pat. No. 3,618,045, has all connect instructions processed through a so-called connect channel designated channel number 2. When accessed, the mailbox locations associated with channel number 2 define the mailbox location of the particular payload channel to be connected. When processor P0 receives the connect interrupt request, it enters level 4 via its interrupt circuits. When in level 4, the processor P0 accesses the channel 2 mailbox in main memory, adjusts the appropriate control word information signalling the answer of the request (i.e., increments by one the connect answered information), and then invokes the system queue routine which places an appropriate eight word entry at a lower level (level 5) into the system queue of FIG. 12, the latter is for dispatching the device handler routine required for executing the operation specified by the connect command. Having an input/output processor process the payload channel information for dispatching the device handler routine at a lower level enables the input/output system to process other connect commands via the connect channel.

However, with respect to the present invention, it will be noted that the system queue routine operating at level 4 upon placing the entry in level 5 of the system queue causes processor P0 to execute an OPC instruction. This instruction causes the contents of a general register location to be ORed with the contents of PCR register 204-22. The general register location is arranged to store a constant having a binary ONE in bit 33. The inclusive OR of the contents of the general register and PCR is then loaded into the PCR register 204-22. This results in the setting of the level 5 interrupt request bit in the PCR register 204-22. At this time, processor P0 has stored a request to enter level 5.

Next, processor P0 is operative to take the necessary action to signal processor P1 that an interrupt request is pending in the level 5 system queue. The system queue routine running at level 4 in processor P0 then executes a PI command directed to port L which is coded to have bit 21 set to a binary ONE (see FIG. 7b).

More specifically, referring to FIG. 14, processor pair 200-0 applies a PI command via the switch, data out register to the crossbar network of SIU 100. The command is loaded into the PI command register and decoded by the decode circuits. The decode circuits force signal SETPII100 to a ONE (see FIG. 3d). Since the processor pair 200-0 is the source of the command, the signal PN100 is forced to a binary ZERO via gate 100-400 of FIG. 14. This causes AND gate 101-307 to force signal SETPIIP1100 to a binary ONE. Thus, the PII interrupt request flip-flop 101-312 for processor pair P1 is switched to a binary ONE. It will be noted that a processor can interrupt the other processor only. A processor cannot interrupt itself.

The AND gate 101-314 also forces signal INT-TYPE2000 to a binary ZERO signalling the presence of a PII interrupt request signal. Assuming that the PII interrupt request is established by the port L interrupt request circuits as the only one outstanding or the request having the highest priority, the circuits force signal T2TOP100 to a binary ONE. This causes gates 101-316 and 101-318 to force signal PNTOII100 to a binary ONE indicating the processor number for the type 2 interrupt request. As seen from FIG. 14, the request is applied to the interrupt logic circuits of both processor pairs via the interrupt data lines IDA. The interrupt request circuits force the interrupt request (IR) line to a binary ONE. The processor number signal is applied to AND/NAND gate 101-204(L). Since the signal is a binary ONE, the interrupt logic circuits for processor pair P1 are enabled to process the request.

Since the processor intercommunication type of request has a high priority (level 2), it will normally interrupt the current task being performed by the processor pair P1. The routine reference by the ICB and type information included in the request is similar to the queue routine described previously. It is very short in duration in that it is operative to reference a control word stored in a predetermined location in local memory 500. The control word has a format similar to that of the process control register in that it includes a plurality of bits which are set to binary ONES to designate which interrupt requests are to be set in the PCR register. In the present example, the control word is coded to indicate the setting of a level 5 interrupt request in the PCR register. The control word is set by the input/output operating system using conventional procedures.

The routine executes an OPC instruction which takes the control word information previously loaded into a general register and ORs it with the interrupt request bits of the PCR register which is loaded back into the PCR register. The routine then causes the processor pair P1 to execute a Release instruction which releases the high level routine. At this point, both processor pairs P0 and P1 have their level 5 interrupt request flip-flops of their PCR registers set to binary ONES.

Both processor pairs continue to execute processes on the basis of priorities. Depending upon the work load of each processor, one of the processors will complete all of the tasks at higher priorities and will switch to level 5. The first processor pair to switch to level 5 is operative to reference the level 5 system queue and fetch the eight word entry stored therein to continue execution of the connect command. More specifically, the processor pair is operative to process the payload channel information resulting in the dispatching of the appropriate device handler routine required to execute the connect command.

FIG. 14 also illustrates the manner in which the processor number flip-flop of multiplexer 300 is controlled by PI commands during the execution of an I/O operation specified by the connect command. That is, when an I/O operation is to be started and the physical channel is to be conditioned for a data transfer operation, one of the things that the channel control program does is indicate to the channel which one of the two I/O processor pairs is to interrupt upon the termination of the transfer (i.e., completion of transfer, error condition, etc.).

To condition the processor number flip-flop in the multiplexer 300, the routine under execution in the I/O processor pair executes a PI command coded to specify port A (multiplexer 300). Referring to FIG. 14, it is seen that the PI command is applied to the switch and is loaded into the data out register. When the SIU 100 accepts the command upon detecting that the crossbar network is available, it transfers the command to multiplexer 300. Here, the processor is identified by the signals provided by gate 100-400 in the SIU 100.

The command is loaded into the HSMUX PI command register and it is decoded. Depending upon which processor pair has issued the command, the processor number flip-flop of the channel specified is set or reset to that state. That is, the processors connected to ports G and H are defined as processor number 0 and the processor number signal is a binary ZERO. The processors connected to ports E and F correspond to processor number 1 and, therefore, the PN signal is forced to a binary ONE. FIG. 4c shows in detail the signal path followed by the processor number signal.

When the multiplexer 300 needs to interrupt a processor pair to signal the end of the transfer, it uses the information signal stored in the processor number flip-flop of the particular channel which specifies that processor pair. In this way, the channel control programs in the system can signal the channels which processors to interrupt, ensuring that the entire execution of a particular I/O command on a channel is executed by the same processor.

While the foregoing arrangement ensures proper identification of processor pairs, it will be appreciated that in certain instances, the processor pair requested by a channel may not be the less busy of the two processors. FIG. 3c illustrates alternate circuits includable within the circuits of the port A interface unit and those ports capable of requesting interrupts to the processor pairs to ensure that processor interrupts are also directed back to the least busy processor pair for processing. These circuits determine which one of the processor pairs should receive an interrupt based upon (1) the processor number as specified by the requestor of the interrupt and (2) the processor pair currently processing the lower priority interrupt.

As seen from FIG. 3c, the additional circuits are indicated by shaded blocks and include comparison circuits 101-224 which connect to the circuits of blocks 101-220 and 101-222, AND/NAND gates 101-203A and 101-204A, flip-flop circuits 101-212A and 101-214B with associated gates 101-210A and 101-211A. The dotted lines are used to indicate that the shaded blocks serve as sources of the signals applied to the lines to which they connect. Hence, they replace the previous sources.

Each of the circuits 101-220 and 101-222 are required to store a set of signals which indicates the priority level of the process each processor pair is executing at any given instant of time for enabling the dispatching of higher priority processes. The sets of signals are applied as inputs to the A and B inputs of the comparison circuits 101-224 and compared. The results of the comparison are applied as a further input to the enabling AND/NAND gates 101-203(A) and 101-204(A). The comparison circuits may also take the form of the circuits disclosed in U.S. Pat. No. 3,955,177.

The flip-flops 101-212A and 101-214A together with associated gates 101-210A and 101-211A are included to preclude both processor pairs P0 and P1 from responding to the same interrupt request. That is, when the comparison circuits 101-224 causes one of the output signals PT(A)IDA00000 or PT(A)IDA00110 to be forced to a binary ONE state, this switches a corresponding one of the flip-flops 101-212A or 101-214A to a binary ONE. The result is that the appropriate decoder circuit is enabled thereby enabling the processing of the interrupt request. However, prior to answering the request by the processor, there could be a change in state of the output signals provided by comparison circuits 101-224 resulting from one of the processor pairs having completed an operation. Accordingly, when one of the flip-flops is switched to a binary ONE, it prevents the other flip-flop from being switched to a binary ONE in response to the same request. Therefore, each time the module, here multiplexer 300, receives a new request, it is operative to force signal PT(A)IR110 to a binary ZERO. This clears both flip-flops 101-212A and 101-214A to binary ZEROS thereby enabling the processing of each request by only one processor pair.

Now, the operation of the subject arrangement will be considered with respect to several examples. First, it is assumed that the two processor pairs are executing processes assigned the same priority levels. This causes both of the comparison circuits output terminals (i.e., A>B and A<B) to be binary ONES. Accordingly, the processor number signal PTAIDA00100 is permitted to pass through gates 101-2-3A and 101-204A for selection of the processor pair specified by the requester.

However, it will be assumed that processor pair P1 is executing a process at a lower priority level than processor pair P0. This means that the processor P1 priority network circuits 101-222 have stored a higher value level number than the circuits 101-220. In this case, the circuits 101-224 force the A>B output to a binary ZERO. This causes gate 101-204A to force signal PT(A)IDA00000 to a binary ZERO and signal PT(A)IDA00110 to a binary ONE notwithstanding the state of processor number signal PTAIDA00100. Accordingly, this switches flip-flop 101-214A to a binary ONE enabling the circuits 101-208. Hence, processor pair P1 is conditioned to process the interrupt request.

By contrast, when processor pair P1 is currently executing a process at a higher priority level than processor pair P0, the comparison circuits 101-224 force the A<B output to a binary ONE. This forces the output of gate 101-203A to a binary ONE resulting in both the input signals applied to gate 101-204A being binary ONES. Accordingly, gate 101-204A forces signal PT(A)IDA00000 to a binary ONE and signal PT(A)IDA00110 to a binary ZERO. The result is that flip-flop 101-212A switches to a binary ONE enabling the circuits 101-206. Hence, processor pair P0 is conditioned to process the interrupt request.

By having the SIU 100 establish the processor number by noting which processor pair is executing a lower priority process, this ensures that the less busy processor of the pair handles processor interrupt requests.

As mentioned above, each of the ports capable of requesting interrupts can be modified to include the alternate circuits of FIG. 3c. This includes all of the ports except those of the local memory module (i.e., LM0 and LM1) which cannot generate interrupts directly.

It will be appreciated that the tasks between the two processor pairs are distributed evely at the beginning, thereby enabling such processor pairs to complete the task each has started. However, with the alternate circuits of FIG. 3c, an arrangement is provided whereby the SIU 100 interrupt circuit interrupts the less busy processor pair and provides the necessary processor number signals.

From the foregoing, it is seen that the arrangement of the present invention provides for a balance in the utilization of input/output processing units of a system in a manner which requires little additional circuits to the system. In accordance with the present invention, indications of interrupt requests specifying various priority levels are set within each processing unit. This enables the least busy processing unit to start the particular I/O task via the execution of a dispatcher routine. Of course, it will be appreciated that the initial distribution of I/O tasks is reasonable thereby ensuring that none of the processing units are overloaded. By organizing the queue in terms of priority levels and having each entry include priority level information, the system provides for the employment of different arrangements for establishing the highest priority task.

It will be appreciated that many changes may be made to the embodiments of the present invention without departing from the teachings thereof. For example, such changes include modifications to the interrupt circuits, priority circuits and command formats. Also, the number of processor modules may be increased.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. An input/output processing system for controlling input/output operations during the concurrent execution of a plurality of program processes, said system including a plurality of modules, said modules including at least one memory module and at least a pair of individual input/output processor modules, a host processor module operative to generate signals for specifying initiation of an input/output operation assigned a particular priority level and a system interface unit having a plurality of ports, each connected to a different one of said plurality of modules, said system interface unit comprising:

a pair of interrupt processing circuit means, one connected to a different one of said pair of input/output processor modules for processing interrupt requests received by the processor module on a priority basis;

processor intercommunication network means connected to each of said pair of interrupt processing logic circuits for enabling communication between said pair of processor modules;

each of said pair of processor modules comprising:

a process control register means for controlling the execution sequence of said program processes, said process control register including a plurality of interrupt bit positions, each for designating the presence of an outstanding interrupt request at a predetermined one of a number of different priority levels; and, control means coupled to receive interrupt request signals from said interrupt logic circuits of said system interface unit associated therewith;

said memory module including a plurality of storage locations, a group of said storage locations defining a queue for storing entries designating new processes to be initiated;

the interrupt processing circuits of one of said input/output processor modules in response to said signals being operative to apply interrupt request signals to said one processor module, said control means being operative to generate a sequence of signals for switching one of said interrupt bit positions to a predetermined state indicating the presence of an interrupt at said assigned particular priority level, and for storing an entry in said queue of said memory module, and said processor intercommunication means being conditioned by signals of said sequence of signals to apply a high priority type interrupt request signal to the interrupt processing circuits of said other processor module, said circuits conditioning said control means of the other processor module to generate signals for switching one of said interrupt bit positions to said predetermined state indicating the presence of said interrupt at said priority level for enabling the less busy processor module of said pair to initiate said input/output operation.

2. The system of claim 1 wherein said system interface unit further includes:

a command register coupled to receive commands from each of said pair of processor modules;

decode circuits connected to said command register and to said intercommunication network means, said decode circuits generating control signals in response to a predetermined one of said commands for conditioning said intercommunication network means to generate an interrupt request; and, system interface interrupt request circuit means connected to said intercommunication network means and to each of said pair of interrupt processing circuit means, said circuit means being connected to receive from said intercommunication network means coded signals specifying an interrupt request and the processor module which is to process said interrupt request.

3. The system of claim 2 wherein said coded signals include a processor number signal, said system interface unit further including gating circuit means connected to said system interface interrupt request circuit means and to said pair of interrupt processing circuits, said gating circuit means selectively combining said processor number and said interrupt request signals for enabling one of said pair of interrupt processing circuit means designated by the state of said processor number signal.

4. The system of claim 3 wherein said commands each include a processor number signal and wherein said processor intercommunication network means includes:
   first bistable means associated with one of said pair of processor modules and having set and reset inputs;
   first and second input gating circuit means connected to said set and reset inputs respectively and to said decode circuits;
   second bistable means associated with the other one of said pair of processor modules and having set and reset inputs; third and fourth input gating circuit means connected to said set and reset inputs respectively and to said decode circuits; and,
   gating circuit means connected to said command register for receiving said processor number signal included in each command and to said first, second, third and fourth input gating circuit means, said gating circuit means selectively applying said processor number signal and the complement of said processor number signal to said first, second, third and fourth input gating circuit means for enabling the setting and resetting of said first and second bistable means in accordance with the state of said processor number signal contained in said command.

5. The system of claim 4 wherein said processor intercommunication network means further includes:
   output gating circuit means connected to said first and second bistable means and to said system interface interrupt request circuit means, said output gating circuit means selectively combining output signals from said first and second bistable means to generate said high priority type interrupt request signal and a processor number signal to be associated with said request signal.

6. The system of claim 5 wherein said system interface unit further includes processor number generating means for generating individual processor number signals for said pair of processor modules, said generating means being individually connected to each one of said pair of processor modules and wherein each one of said pair of processor modules further includes:
   circuit means connected to receive a predetermined one of said processor number signals from said generating means and a data out register coupled to said circuit means, said register for storing signals of each command to be transferred to said system interface unit, said circuit means being operative to load a signal corresponding to said predetermined one of said processor number signals into said data out register for inclusion in each of said commands.

7. The system of claim 6 wherein said processor number generating means includes:
   gating means having an input terminal and first and second output terminals, said input terminal being connected to receive an input signal having a predetermined state, said first output terminal being connected to the circuit means of a predetermined one of said pair of processor modules and said second output terminals being connected to the circuit means of the other one of said pair of processor modules, said gating means being conditioned by said input signal to apply processor number signals to said first and second output terminals having different predetermined states for assignment of different processor numbers to said pair of processor modules.

8. The system of claim 7 wherein said gating means includes a NAND/AND circuit and wherein said predetermined state of said input signal is a binary ZERO and said different predetermined states of said processor number signals are complementary.

9. The system of claim 3 wherein said plurality of modules further includes a main memory module including a control unit, said control unit comprising:
   a command register coupled to receive commands from one of said pair of processor modules;
   decode circuits connected to said command register for generating control signals in response to said commands;
   bistable storage means connected to said decode circuits;
   interrupt request circuits connected to said bistable storage means, said pair of interrupt processing logic circuits and to said host processor module for receiving said signals specifying the initiation of said input/output operation; and,
   said one processor module initially applying a command to said command register, said decode circuits being conditioned by said command to switch said bistable storage means to a predetermined state and said interrupt request circuits being conditioned by said bistable storage means to apply to said pair of interrupt processing circuit means a processor number signal as part of said signals, said processor number signal being coded to specify one of said pair of processor modules in accordance with said predetermined state of said bistable storage means.

10. The system of claim 9 wherein said memory module includes a number of storage locations for storing instructions of a dispatcher routine, one of said pair of input/output processor modules first switching to process said interrupt request at said particular priority level being conditioned by said instructions of said dispatcher routine to fetch said entry from said queue for initiation of said input/output operation.

11. The system of claim 10 wherein said queue comprises a number of groups of storage locations, each group for storing entries at a different one of said number of different priority levels and said one input/output processor module being conditioned by signals included in said sequence to store said entry in one of said number of groups specified by said particular priority level.

12. The system of claim 11 wherein said entry is coded to include information specifying said particular priority level and information required for initiating said input/output operation.

13. The system of claim 1 wherein said system includes a plurality of peripheral devices, each of said processor modules further including interrupt control means for processing said interrupt requests using a number of interrupt routines stored in said memory module, said plurality of modules further including a multiplexer module, said multiplexer module including at least one adapter port coupled to said plurality of peripheral devices, said multiplexer module comprising:
  a plurality of registers, each being arranged for storing interrupt control information coded for specifying any one of said number of interrupt routines and a processor number signal for designating which one of said pair of processor modules is to process said interrupt request, and
  control means coupled to said plurality of registers and to said adapter port for receiving event signals indicating the completion of an input/output operation, said control means being operative in response to said event signals to transfer to said system interface unit, the processor number contents of a designated one of said plurality of registers as part of an interrupt request.

14. The system of claim 13 wherein each of said interrupt processing circuit means includes:
  priority network circuits; and
  a plurality of interrupt interface circuits corresponding in number to said plurality of ports, each of said interrupt interface circuits being individually coupled to the priority network circuits of each interrupt processing circuit means, each of said interface circuits including gating means for selectively combining a processor number signal and an interrupt request signal from the module connected to the port associated therewith for activating one of said pair of priority network circuits in accordance with the state of said processor number signal.

15. The system of claim 14 wherein each of said priority network circuits includes register means for storing coded signals indicative of the priority level of the process currently being executed by said input/output processor module associated therewith, and
  wherein each of said interrupt processing circuit means further includes comparison circuit means coupled to the register means of each of said priority network circuits and to the gating means of each of said interrupt interface circuits, said comparison means being operative to generate signals indicating the results of comparing the priority levels of the processes being executed by said pair of processor modules, said gating means of each of said interface circuits being conditioned by said signals to activate one of said pair of priority network circuits associated with said less busy processor module enabling the processing of input/output interrupt requests by said less busy processor module.

16. The system of claim 15 wherein each of said gating means includes means coupled to said comparison circuit means for generating a processor number signal coded for designating said less busy processor module.

17. An input/output processing system for controlling input/output operations during the concurrent execution of a plurality of processes, said system including a plurality of modules, said modules including an input/output memory module and a plurality of individual input/output processor modules, a main memory module operative to generate signals for specifying initiation of an input/output operation at a particular priority level and a system interface unit having a plurality of ports, each connected to a different one of said plurality of modules, said system interface unit comprising:
  a plurality of interrupt processing circuit means, each connected to a different one of said plurality of input/output processor modules for processing on a priority basis interrupt requests received by the processor module;
  intercommunication network means connected to each of said plurality of interrupt processing circuit means for enabling communication between said plurality of processor modules;
each of said plurality of processor modules comprising:
  control register means for controlling the execution sequence of said processes, said control register means including a plurality of interrupt bit positions, each for designating the presence of an outstanding interrupt request at one of a number of different priority levels; and,
  control means coupled to receive interrupt request signals from said interrupt logic circuit means associated therewith;
  said input/output memory module including a plurality of storage locations, a group of said storage locations defining a queue for storing entries designating new processes to be initiated;
  the interrupt processing circuit means of one of said plurality of input/output processor modules in response to said signals from said main memory module being operative to apply interrupt request signals to said one processor module, said control means being operative to generate a sequence of signals for switching of a predetermined one of said interrupt bit positions of said control register means to a predetermined state indicating the presence of an interrupt at said particular priority level and storing an entry in said queue of said input/output memory module, and
  said intercommunication means being conditioned by signals of said sequence to apply high priority type interrupt request signals to the interrupt processing circuit means of said another one of said plurality of processor modules, said circuit means conditioning said control means of said another processor module to generate signals for switching said predetermined one of said interrupt bit positions to said predetermined state indicating the presence of said interrupt at said particular priority level enabling the least busy processor module of said plurality to initiate said input/output operation thereby balancing the utilization of said input/output processor modules.

18. The system of claim 17 wherein said plurality of modules further includes a host processor module coupled to one of said plurality of said ports, said host processor module being operative to apply signals to said main memory module for conditioning said main memory module to generate said signals for specifying said initiation of said input/output operation.

19. The system of claim 18 wherein said system interface unit further includes:
  a command register coupled to receive commands from each of said plurality of processor modules;
  decode circuits connected to said command register and to said intercommunication network means, said decode circuits generating control signals in response to a predetermined one of said commands for conditioning said intercommunication network means to generate an interrupt request; and,
  system interface interrupt request circuit means connected to said intercommunication network means and to each of said plurality of interrupt processing circuit means, said request circuit means being connected to receive from said intercommunication network means coded signals specifying an interrupt request and the processor module which is to process said interrupt request.

20. The system of claim 19 wherein said coded signals include a processor number signal, said system interface unit further including gating circuit means connected to said system interface interrupt request circuit means and to said pair of interrupt processing circuit means, said gating circuit means selectively combining said processor number and said interrupt request signals for enabling one of said plurality of interrupt processing circuit means designated by the state of said processor number signal.

21. The system of claim 20 wherein said commands each include a processor number signal and wherein said processor intercommunication network means includes:
  first bistable means associated with one of said plurality of processor modules and having set and reset inputs;
  first and second input gating circuit means connected to said set and reset inputs respectively and to said decode circuits;
  second bistable means associated with another one of said plurality of processor modules and having set and reset inputs; third and fourth input gating circuit means connected to said set and reset inputs respectively and to said decode circuits; and,
  gating circuit means connected to said command register for receiving said processor number signal included in each command and to said first, second, third and fourth input gating circuit means, said gating circuit means selectively applying said processor number signal and the complement of said processor number signal to said first, second, third and fourth input gating circuit means for enabling the setting and resetting of said first and second bistable means in accordance with the state of said processor number signal contained in said command.

22. The system of claim 21 wherein said processor intercommunication network means further includes:
  output gating circuit means connected to said first and second bistable means and to said system interface interrupt request circuit means, said output gating circuit means selectively combining output signals from said first and second bistable means to generate said high priority type interrupt request signal and a processor number signal to be associated with said request signal.

23. The system of claim 22 wherein said system interface unit further includes processor number generating means for generating individual processor number signals for said plurality of processor modules, said generating means being individually connected to each one of said plurality of processor modules and wherein each one of said plurality of processor modules further includes:
  circuit means connected to receive a predetermined one of said processor number signals from said generating means and a data out register coupled to said circuit means, said register for storing signals of each command to be transferred to said system interface unit, said circuit means being operative to load a signal corresponding to said predetermined one of said processor number signals into said data out register for inclusion in each of said commands.

24. The system of claim 23 wherein said processor number generating means includes:
  gating means having an input terminal and first and second output terminals, said input terminal being connected to receive an input signal having a predetermined state, said first output terminal being connected to the circuit means of a predetermined one of said plurality of processor modules and said second output terminals being connected to the circuit means of the other one of said plurality of processor modules, said gating means being conditioned by said input signal to apply processor number signals to said first and second output terminals having different predetermined states for assignment of different processor numbers to said plurality of processor modules.

25. The system of claim 24 wherein said gating means includes a NAND/AND circuit and wherein said predetermined state of said input signal is a binary ZERO and said different predetermined states of said processor number signals are complementary.

26. The system of claim 20 wherein said main memory module further includes a control unit comprising:
  a command register coupled to receive commands from one of said plurality of processor modules;
  decode circuits connected to said command register for generating control signals in response to said commands;
  bistable storage means connected to said decode circuits;
  interrupt request circuits connected to said bistable storage means, said plurality of interrupt processing circuit means and to said host processor module for receiving said signals specifying the initiation of said input/output operation; and,
  said one processor module initially applying a command to said command register, said decode circuits being conditioned by said command to switch said bistable storage means to a predetermined state and said interrupt request circuits being conditioned by said bistable storage means to apply to said plurality of interrupt processing circuit means a processor number signal as part of said signals, said processor number signal being coded to specify one of said plurality of processor modules in accordance with said predetermined state of said bistable storage means.

27. The system of claim 17 wherein said system includes a plurality of peripheral devices, each of said processor modules further including interrupt control means for processing said interrupt requests using a number of interrupt routines stored in said input/output memory module, said plurality of modules further including a multiplexer module, said multiplexer module including at least one adapter port coupled to said plurality of peripheral devices, said multiplexer module comprising:
  a plurality of registers, each being arranged for storing interrupt control information coded for specifying any one of said number of interrupt routines and a processor number signal for designating which one of said plurality of processor modules is to process said interrupt request, and
  control means coupled to said plurality of registers and to said adapter port for receiving event signals indicating the completion of an input/output operation, said control means being operative in response to said event signals to transfer to said system interface unit, the processor number contents of a designated one of said plurality of registers as part of an interrupt request.

28. The system of claim 27 wherein said input/output memory module includes a number of storage locations for storing instructions of a dispatcher routine, said one of said plurality of input/output processor modules first switching to process said interrupt request at said particular priority level being conditioned by said instructions of said dispatcher routine to fetch said entry from said queue for initiation of said input/output operation.

29. The system of claim 28 wherein said queue comprises a number of groups of storage locations, each group for storing entries at a different one of said number of different priority levels and said one input/output processor module being conditioned by signals included in said sequence to store said entry in one of said number of groups specified by said particular priority level.

30. The system of claim 27 wherein each of said plurality of interrupt processing circuit means includes:
priority network circuits; and
a plurality of interrupt interface circuits corresponding in number to said plurality of ports, each of said interrupt interface circuits being individually coupled to the priority network circuits of each interrupt processing circuit means, each of said interface circuits including gating means for selectively combining a processor number signal and an interrupt request signal from the module connected to the port associated therewith for activating one of said pair of priority network circuits in accordance with the state of said processor number signal.

31. The system of claim 30 wherein each of said priority network circuits includes register means for storing coded signals indicative of the priority level of the process currently being executed by said input/output processor module associated therewith, and
wherein each of said interrupt processing circuit means further includes comparison circuit means coupled to the register means of each of said priority network circuits and to the gating means of each of said interrupt interface circuits, said comparison means being operative to generate signals indicating the results of comparing the priority levels of the processes being executed by said pair of processor modules, said gating means of each of said interface circuits being conditioned by said signals to activate one of said plurality of priority network circuits associated with said least busy processor module enabling the processing of input/output interrupt requests by said least busy processor module.

32. The system of claim 31 wherein each of said gating means includes means coupled to said comparison circuit means for generating a processor number signal coded for designating said least busy processor module.

33. An input/output processing system for controlling input/output operations during the concurrent execution of a plurality of input/output processes, said system including a plurality of modules, said modules including a local memory module, a main memory module and $n$ number of individual input/output processor modules, a host processor module operative to apply to said main memory module connect signals for specifying the initiation of an input/output operation at a designated priority level and a system interface unit having a plurality of ports, each connected to a different one of said plurality of modules, said system interface unit comprising:
$n$ number of interrupt processing logic circuits, one connected to a different one of said number of input/output processor modules for processing interrupt requests received by the processor module on a priority basis;
intercommunication network means connected to each of said number of interrupt processing logic circuits for enabling communication between said number of processor modules;
each of said number of processor modules comprising:
a process control register for controlling the execution sequence of said processes, said process control register including a plurality of interrupt bit positions, each for designating the presence of an outstanding interrupt request at a predetermined one of a number of different priority levels; and,
microprogrammed control means coupled to receive interrupt request signals from said interrupt logic circuits of said system interface unit associated therewith; and
said local memory module including a plurality of storage locations, a group of said storage locations and a queue for storing entires designating new input/output processes to be initiated;
the interrupt processing logic circuits of a first one of said number of input/output processor modules in response to connect signals from said main memory module being operative to apply interrupt request signals to said first processor module, said microprogrammed control means being operative to generate a sequence of signals for switching of one of said interrupt bit positions to a predetermined state indicating the presence of an interrupt at said designated level and for storing an entry in said queue of said local memory module, and
said processor intercommunication means being conditioned by said signals of said sequence to apply high priority type interrupt request signals to the interrupt processing logic circuits of said another one of said number of processor modules, said circuits conditioning said microprogrammed control means of another processor module to generate signals for switching a predetermined one of said interrupt bit positions to said predetermined state indicating the presence of said interrupt request at said designated priority level to enable the least busy processor module of said number to initiate said input/output operation thereby balancing the utilization of said number of input/output processor modules.

34. The system of claim 33 wherein said system interface unit further includes:
a command register coupled to receive commands from each of said pair of processor modules;
decode circuits connected to said command register and to said intercommunication network means, said decode circuits generating control signals in response to a predetermined one of said commands for conditioning said intercommunication network means to generate an interrupt request; and,
system interface interrupt request circuit means connected to said intercommunication network means and to each of said number of interrupt processing circuits, said circuit means being connected to receive from said intercommunication network means coded signals specifying an interrupt request and the processor module which is to process said interrupt request.

35. The system of claim 34 wherein said commands each include a processor number signal and wherein said processor intercommunication network means includes:
 first bistable means associated with one of said number of processor modules and having set and reset inputs;
 first and second input gating circuit means connected to said set and reset inputs respectively and to said decode circuits;
 second bistable means associated with another one of said number of processor modules and having set and reset inputs; third and fourth input gating circuit means connected to said set and reset inputs respectively and to said decode circuits; and,
 gating circuit means connected to said command register for receiving said processor number signal included in each command and to said first, second, third and fourth input gating circuit means, said gating circuit means selectively applying said processor number signal and the complement of said processor number signal to said first, second, third and fourth input gating circuit means for enabling the setting and resetting of said first and second bistable means in accordance with the state of said processor number signal contained in said command.

36. The system of claim 35 wherein said processor intercommunication network means further includes:
 output gating circuit means connected to said first and second bistable means and to said system interface interrupt request circuit means, said output gating circuit means selectively combining output signals from said first and second bistable means to generate said high priority type interrupt request signal and a processor number signal to be associated with said request signal.

37. The system of claim 36 wherein said system interface unit further includes processor number generating means for generating individual processor number signals for said number of processor modules, said generating means being individually connected to each one of said number of processor modules and wherein each one of said number of processor modules further includes:
 circuit means connected to receive a predetermined one of said processor number signals from said generating means and a data out register coupled to said circuit means, said register for storing signals of each command to be transferred to said system interface unit, said circuit means being operative to load a signal corresponding to said predetermined one of said processor number signals into said data out register for inclusion in each of said commands.

38. The system of claim 37 wherein said processor number generating means includes:
 gating means having an input terminal and first and second output terminals, said input terminal being connected to receive an input signal having a predetermined state, said first output terminal being connected to the circuit means of a predetermined one of said number of processor modules and said second output terminal being connected to the circuit means of the other one of said number of processor modules, said gating means being conditioned by said input signal to apply processor number signals to said first and second output terminals having different predetermined states for assignment of different processor numbers to said number of processor modules.

39. The system of claim 33 wherein said system includes a plurality of peripheral devices, each of said processor modules further including interrupt control means for processing said interrupt requests using a number of interrupt routines stored in said local memory module, said plurality of modules further including a multiplexer module, said multiplexer module including at least one adapter port coupled to said plurality of peripheral devices, said multiplexer module comprising:
 a plurality of registers, each being arranged for storing interrupt control information coded for specifying any one of said number of interrupt routines and a processor number signal for designating which one of said number of processor modules is to process said interrupt request, and
 control means coupled to said plurality of registers and to said adapter port for receiving event signals indicating the completion of an input/output operation, said control means being operative in response to said event signals to transfer to said system interface unit, the processor number contents of a designated one of said plurality of registers as part of an interrupt request.

40. The system of claim 39 wherein said local memory module includes a number of storage locations for storing instructions of a dispatcher routine, one of said number of input/output processor modules first switching to process said interrupt request at said particular priority level being conditioned by said instructions of said dispatcher routine to fetch said entry from said queue for initiation of said input/output operation.

41. The system of claim 40 wherein each of said n number of interrupt processing circuits includes:
 priority network circuits; and
 a plurality of interrupt interface circuits corresponding in number to said plurality of ports, each of said interrupt interface circuits being individually coupled to the priority network circuits of each of said interrupt processing circuits, each of said interface circuits including gating means for selectively combining a processor number signal and an interrupt request signal from the module connected to the port associated therewith for activating one of said n number of priority network circuits in accordance with the state of said processor number signal.

42. The system of claim 41 wherein each of said priority network circuits includes register means for storing coded signals indicative of the priority level of the process currently being executed by said input/output processor module associated therewith, and
 wherein each of said interrupt processing circuits further include comparison circuit means coupled to the register means of each of said priority network circuits and to the gating means of each of said interrupt interface circuits, said comparison means being operative to generate signals indicating the results of comparing the priority levels of the processes being executed by said number of processor modules, said gating means of each of said interface circuits being conditioned by said signals to activate one of said number of priority network circuits associated with said least busy processor module enabling the processing of input-/output interrupt requests by said least busy processor module.

43. The system of claim 42 wherein each of said gating means includes means coupled to said comparison circuit means for generating a processor number signal coded for designating said least busy processor module.

* * * * *